(12) United States Patent
Closen et al.

(10) Patent No.: US 12,516,690 B2
(45) Date of Patent: Jan. 6, 2026

(54) BEAM CONNECTOR, CONNECTOR MEMBER THEREOF, DRILL JIG THEREFOR, AND BEAM ASSEMBLY COMPRISING THE SAME

(71) Applicant: MY-TI-CON TIMBER CONNECTORS INC., Surrey (CA)

(72) Inventors: Maximilian Closen, North Vancouver (CA); Tyler Best, Ladysmith (CA); Wes Wei-Chih Lin, Vancouver (CA); Jean-Philippe Letarte, Saint-Bruno-de-Montarville (CA); Jordan Ross, Owen Sound (CA); Nathan Loewen, Coldstream (CA)

(73) Assignee: MY-TI-CON TIMBER CONNECTORS INC., Surrey (CA)

(*) Notice: Subject to any disclaimer, the term of this patent is extended or adjusted under 35 U.S.C. 154(b) by 0 days.

(21) Appl. No.: 18/790,061

(22) Filed: Jul. 31, 2024

(65) Prior Publication Data

US 2025/0257752 A1     Aug. 14, 2025

Related U.S. Application Data

(60) Provisional application No. 63/551,403, filed on Feb. 8, 2024.

(51) Int. Cl.
*F16B 5/06* (2006.01)
*E04B 1/26* (2006.01)

(52) U.S. Cl.
CPC .... *F16B 5/0642* (2013.01); *E04B 2001/2628* (2013.01); *Y10T 403/61* (2015.01); *Y10T 403/70* (2015.01)

(58) Field of Classification Search
CPC .. E04B 1/2604; E04B 1/388; E04B 2001/262; E04B 2001/2624;
(Continued)

(56) References Cited

U.S. PATENT DOCUMENTS

| 924,912 A | 6/1909 | Maydl |
| 1,533,724 A * | 4/1925 | Clarke-James ....... E04B 1/2604 403/381 |

(Continued)

FOREIGN PATENT DOCUMENTS

| DE | 202008008130 U1 | 9/2008 |
| DE | 102010018593 A1 | 10/2011 |

(Continued)

*Primary Examiner* — Amber R Anderson
*Assistant Examiner* — Kevin J Baynes
(74) *Attorney, Agent, or Firm* — Nicholas Garner; Oyen Wiggs Green & Mutala LLP

(57) ABSTRACT

There is provided a beam connector comprising first and second longitudinally-extending connector members. Each connector member includes a protrusion adjacent a first end portion thereof and which extends between a first side and a second side thereof. Each connector member includes a receptacle adjacent a second end portion thereof and which extends in an arc-shape laterally from the first side to the second side thereof. The receptacle of the first connector member is shaped to receive the protrusion of the second connector member. The receptacle of the second connector member is shaped to receive the protrusion of the first connector member.

20 Claims, 12 Drawing Sheets

(58) Field of Classification Search
CPC ..... E04B 2001/2628; E04B 2001/2632; E04B 2001/2644; E04B 2001/2652; E04B 2001/389; F16B 5/0642; F16B 5/0657; F16B 5/0664; F16B 5/07; F16B 7/22; F16B 2200/30; Y10T 403/30; Y10T 403/61; Y10T 403/65; Y10T 403/655; Y10T 403/70; Y10T 403/7016; Y10T 403/7152

See application file for complete search history.

(56) References Cited

U.S. PATENT DOCUMENTS

| | | | | |
|---|---|---|---|---|
| 5,433,416 | A * | 7/1995 | Johnson | B65D 23/003 403/381 |
| 5,688,069 | A * | 11/1997 | Hoshino | E04B 1/215 403/339 |
| 5,779,380 | A | 7/1998 | Knapp | |
| 6,547,478 | B1 * | 4/2003 | Lin | A47B 96/068 403/339 |
| 7,793,981 | B2 * | 9/2010 | Xie | B62D 21/20 403/337 |
| 7,909,530 | B2 | 3/2011 | Okura | |
| 8,974,139 | B2 * | 3/2015 | Saul | F16B 12/125 297/440.1 |
| 9,091,056 | B2 | 7/2015 | Stauffer et al. | |
| 9,133,867 | B2 * | 9/2015 | Lang | B25B 1/103 |
| 10,422,153 | B2 * | 9/2019 | Xu | E04H 15/44 |
| 10,822,788 | B2 | 11/2020 | Knapp | |
| 10,968,621 | B2 | 4/2021 | Knapp | |
| 11,085,478 | B2 * | 8/2021 | Trego | B25H 1/02 |
| 2007/0154258 | A1 * | 7/2007 | Knapp | F16B 12/32 403/331 |
| 2008/0213040 | A1 * | 9/2008 | Morze-Reichartz | E04C 3/18 52/282.4 |
| 2009/0038882 | A1 * | 2/2009 | Saly | E04B 1/82 181/290 |
| 2021/0230858 | A1 | 7/2021 | Daudet | |
| 2023/0332395 | A1 * | 10/2023 | Murphy | E04B 1/2604 |
| 2023/0375018 | A1 * | 11/2023 | Knapp | F16B 5/0036 |
| 2023/0392367 | A1 * | 12/2023 | Daudet | A47B 95/008 |
| 2024/0011278 | A1 * | 1/2024 | Knapp | F16B 43/02 |

FOREIGN PATENT DOCUMENTS

| | | | |
|---|---|---|---|
| DE | 102019200390 B4 | 11/2023 | |
| EP | 1239092 A1 * | 9/2002 | ......... E04B 1/2604 |
| EP | 1764447 A2 | 3/2007 | |
| FR | 2861763 A1 * | 5/2005 | ......... E04B 1/2604 |
| JP | 4478514 B2 | 6/2010 | |
| WO | 2006089539 A1 | 8/2006 | |
| WO | 2022079007 A2 | 4/2022 | |

* cited by examiner

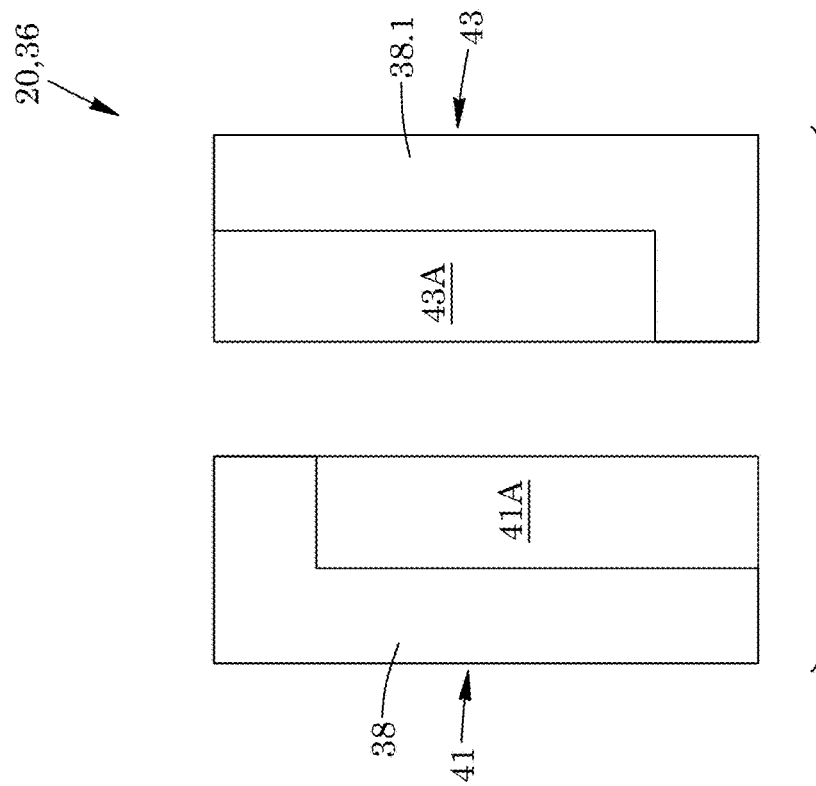
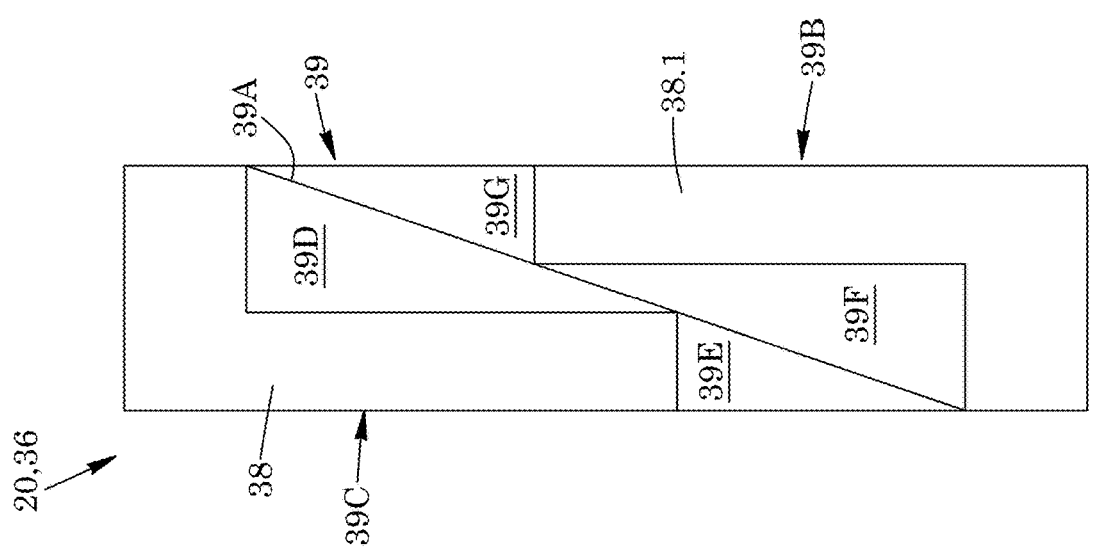

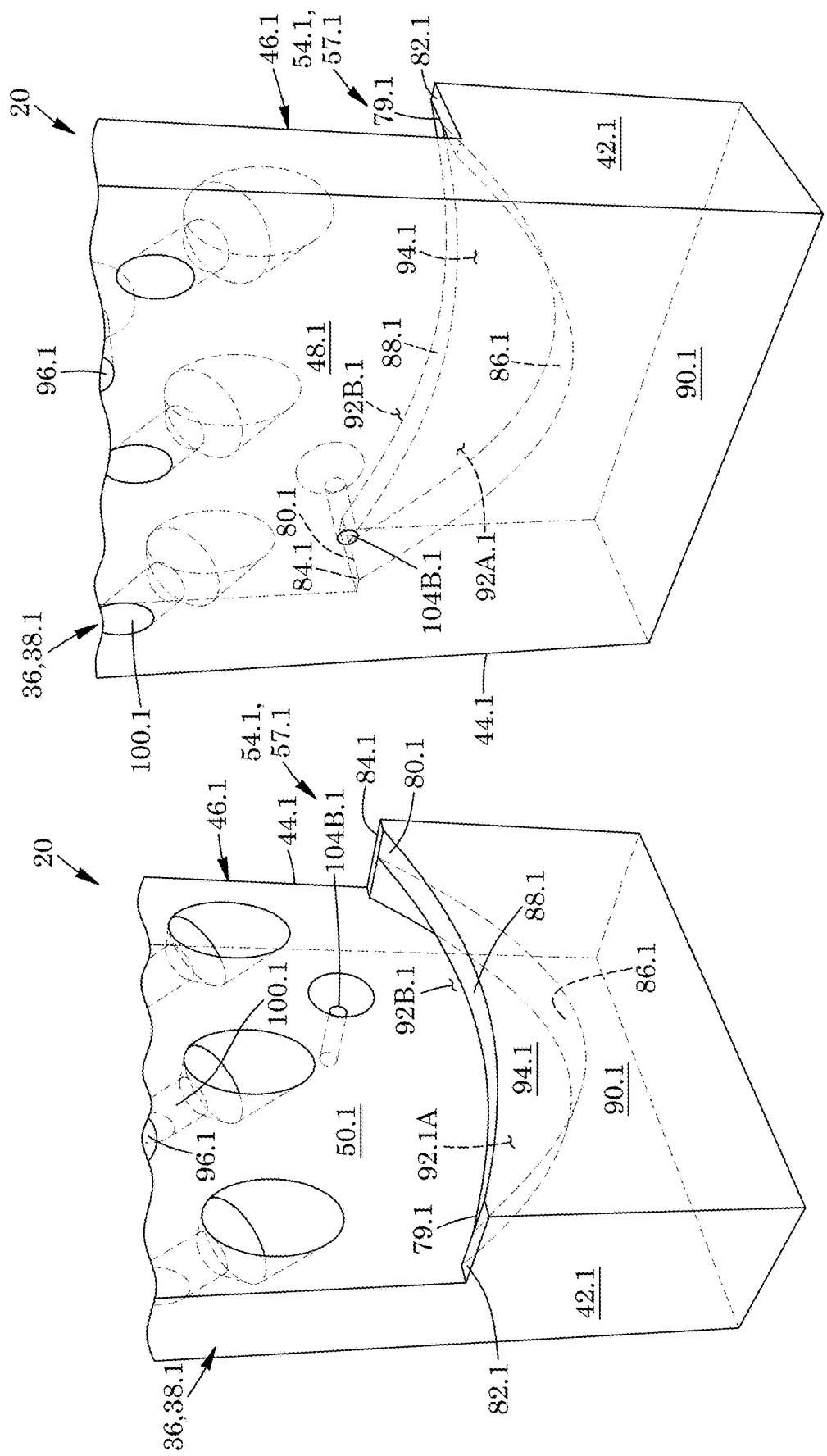

BEAM CONNECTOR, CONNECTOR MEMBER THEREOF, DRILL JIG THEREFOR, AND BEAM ASSEMBLY COMPRISING THE SAME

BACKGROUND OF THE INVENTION

Field of the Invention

There is provided a beam connector, connector member thereof, a drill jig therefor, and beam assembly comprising the same. In particular, there is provided a beam connector for coupling together mass timber products, together with connector members thereof, a drill jig for the installation thereof, and a beam assembly comprising mass timber products.

Description of the Related Art

International Patent Application Publication No. WO 2022/079007A2 to Knapp discloses a connector for two workpieces. The connector has two fittings, which each have a mounting side for a workpiece and an opposing connecting side, at which the fittings can be hooked into each other in a hooking direction running parallel to the connecting side. Each fitting includes, on the connecting side thereof, a shoulder which extends over the full width of the fitting transverse to the hooking direction. Each fitting has an undercut which leaves a web on the shoulder. The end face of the fitting remote from the shoulder and adjacent to the connecting side has a lip adjacent to the connecting side extending over the full width of the fitting transverse to the hooking direction. In a first position of the fittings hooked into one another, the lip of each fitting engages in the undercut of the other fitting in each case.

U.S. Pat. No. 7,909,530 to Okura discloses a technique which may extensively increase the efficiency of the construction of large-size wooden building and effectively use the loading space when materials for construction are transported fixes a basic hardware on a lateral surface of a longitudinal member with a subsidiary hardware on an end surface of a lateral member. The basic hardware has an upper tapered portion and a lower receiving portion and is affixed to the longitudinal member. The subsidiary hardware is affixed to the lateral member and has a lower tapered portion and an upper receiving portion that engage with the upper tapered portion and the lower receiving portion, respectively, of the basic hardware to join the longitudinal member and the lateral member together.

International Patent Application Publication No. WO 2006/089539A1 to Knapp discloses a mounting for connecting two components. The mounting consists of a retaining part and a receiving part, which are respectively connected to the component to be connected. The retaining part has the following features: a retaining plate comprising fixing bores, through which run fixing screws for fixing the retaining plate to the first component. A retaining element with a conical head is situated in the region of the fixing bores. The receiving part has the following features: a receiving plate comprising a large number of fixing bores for fixing the receiving plate to the second component. The receiving part is equipped with a receiving cavity that corresponds with the conical head of the retaining element, the receiving cavity having the following features: a front section comprising V-shaped edges and a rear section, which is configured as a semi-circular cavity, the V-shaped edges and the semi-circular cavity being bent at a predetermined angle. The angle corresponds with the edge angle of the conical head.

The above-described prior art may suffer a number of disadvantages.

BRIEF SUMMARY OF INVENTION

There is provided, and it is an object to provide, an improved beam connector, as well as one or more connector members thereof and a beam assembly comprising the same, disclosed herein.

There is accordingly provided a beam connector according to one aspect. The beam connector includes first and second longitudinally-extending connector members. Each connector member includes a protrusion adjacent a first end portion thereof and which extends between a first side and a second side thereof. Each connector member includes a receptacle adjacent a second end portion thereof and which extends in an arc-shape laterally from the first side to the second side thereof. The receptacle of the first connector member is shaped to receive the protrusion of the second connector member. The receptacle of the second connector member is shaped to receive the protrusion of the first connector member.

There is also provided a beam connector according to another aspect. The beam connector includes first and second connector members. Each connector member includes a protrusion adjacent a first end portion thereof and a receptacle adjacent a second end portion thereof. The receptacle of the first connector member is shaped to receive the protrusion of the second connector member. The receptacle of the second connector member is shaped to receive the protrusion of the first connector member. Each connector member has a plurality of apertures extending therethrough shaped to receive fasteners therethrough for coupling to a respective beam. Each connector member has a pair of positioning apertures near or adjacent the protrusion and the receptacle thereof, respectively. The positioning apertures are shaped to receive positioning fasteners therethrough to promote precise positioning of the connector members relative to the beams prior to fully fastening the connector members to the beam.

There is further provided a drill jig for a beam connector and/or one of the above described beam connectors. The drill jig includes an elongate body having a bore extending between proximal and distal ends thereof. The bore is shaped to snugly receive a drill bit therethrough. The drill jig includes an end portion shaped to fit within and/or mate with at least one countersunk aperture of the beam connector. The end portion of the drill jig includes a distal sub-portion shaped to fit within an inner bore of the at least one countersunk aperture. The end portion of the drill jig includes a proximal sub-portion shaped to fit within and abut a flared and/or tapered bore of the at least one countersunk aperture.

There is additionally provided a method of installing a beam connector. The beam connector includes a pair of connector members each having a plurality of apertures extending therethrough and via which a pair of structural members are coupled together. The method includes providing each connector member with a pair of positioning apertures extending therethrough and between which are positioned the plurality of apertures thereof. The method includes arranging the positioning apertures to be axially offset and/or near respective sides of the respective said connector member. The method includes drilling pilot holes into respective said structural members via a drill jig so inserted into respective ones of the positioning apertures. The method includes coupling respective said connector members to respective said the structural members via fasteners extending through the positioning apertures so as to promote positioning of the connector members relative to the structural members. The method includes further coupling the connector members to the structural members via additional fasteners extending through the plurality of apertures.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention:

FIG. 8 is a schematic side elevation view of a solid block element via which the connector members of FIG. 1 may be obtained after machine milling according to one non-limiting embodiment;

FIG. 9 is a schematic side elevation view of a pair of blocks element via which the connector members of FIG. 1 may be obtained after machine milling according to another non-limiting embodiment;

FIG. 11A is an outer/front, top, right side perspective view of the second connector member of FIG. 5 showing a receptacle thereof, the second connector member being shown in fragment;

FIG. 11B is an inner/rear, top, right side perspective view of the second connector member of FIG. 5 showing the receptacle thereof, the second connector member being shown in fragment;

DESCRIPTION OF THE PREFERRED EMBODIMENTS

Throughout the following description, specific details are set forth in order to provide a more thorough understanding of the invention. However, the invention may be practiced without these particulars. In some instances, well known elements have not been shown or described in detail to avoid unnecessarily obscuring the invention. Accordingly, the specification and drawings are to be regarded in an illustrative, rather than a restrictive, sense.

Figure 1:
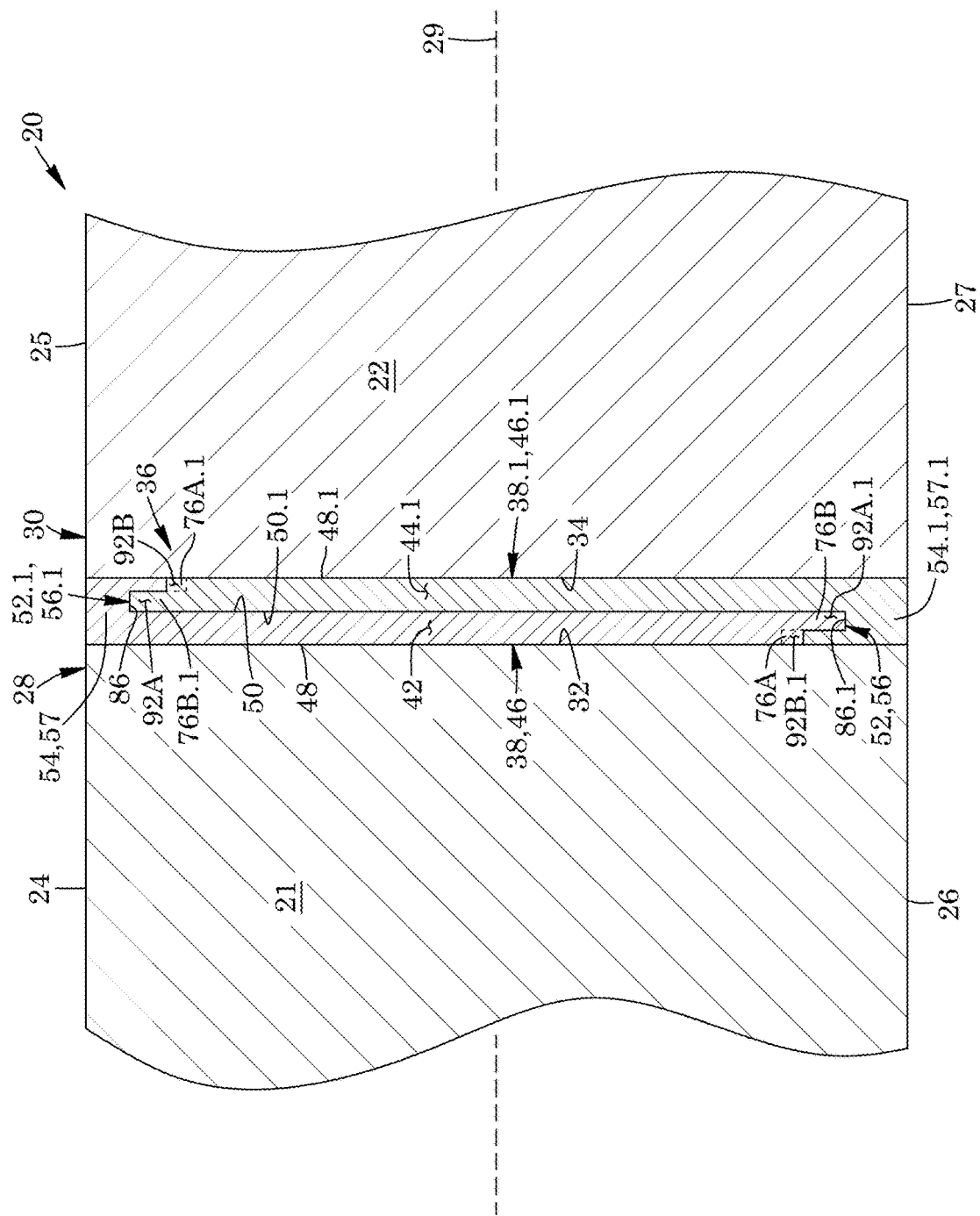
FIG. 1 is a side elevation view of a beam assembly according to one aspect, the beam assembly including first and second mass timber members shown in longitudinal section, as well as first and second connector members shown in lateral section without fastener apertures thereof being shown extending therethrough, with the first and second members coupling to respective said mass timber members via fasteners (not shown) and coupling to each other.

Referring to the drawings and first to FIG. 1, there is shown a beam assembly, in this non-limiting embodiment a mass timber assembly 20. However, this is not strictly required, and the assembly as herein described may be used for not only timber beams but also for other structures (e.g. columns, panels, joists, posts, headers or the like) and/or structural materials, such as metal (e.g. steel), concrete, polymers, composites, any combination thereof and the like.

The mass timber assembly includes first and second elongate members, in this non-limiting embodiment first and second structural members, in this non-limiting example solid, structural, load-bearing components, in this case first and second mass timber products or members 21 and 22. However, this is not strictly required and the members may comprise other types of beams, structural members, wood products, metal beams/columns, composite beams/columns or the like in other embodiments. Mass timber members 21 and 22 may be referred to as first and second workpieces.

Figure 2:
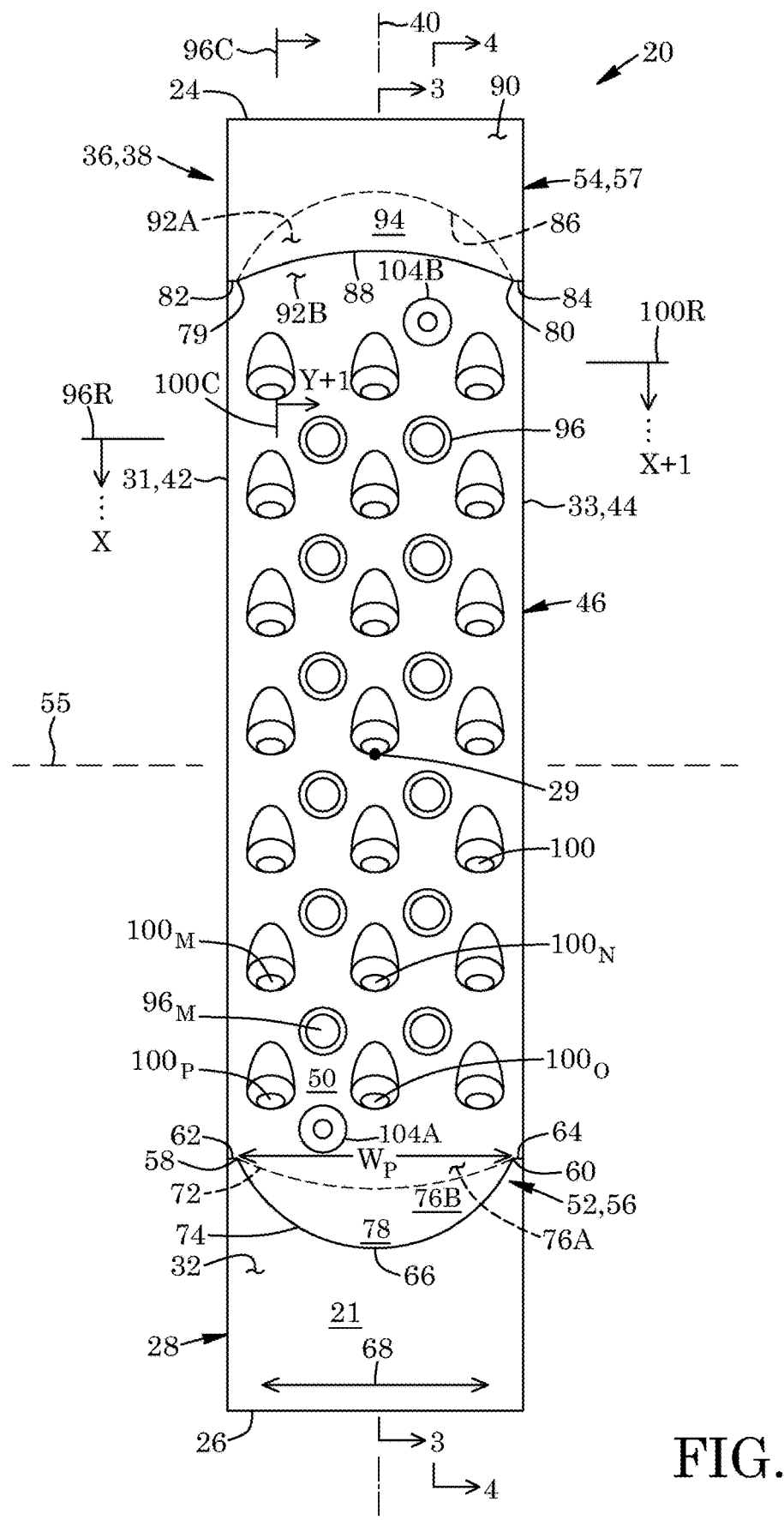
FIG. 2 is an end elevation view of the first mass timber member thereof and an outer elevation view of the first connector member thereof coupled thereto, with fasteners via which the first mass timber member and the first connector member couple together not being shown.

The mass timber members are elongate and extend along a longitudinal axis 29. Mass timber members 21 and 22 are rectangular prisms in shape in this non-limiting embodiment; however, this is not strictly required. The mass timber members have longitudinally-extending first or upper sides or tops 24 and 25 and longitudinally-extending second or lower sides or bottoms 26 and 27 spaced-apart from the tops thereof. Mass timber members 21 and 22 include end portions 28 and 30 along which extend attachment faces 32 and 34. The end portions and attachment faces extend between tops 24/25 and bottoms 26/27 of mass timber members 21/22. Attachment faces 32 and 34 of the mass timber members extend laterally and parallel to each other in this non-limiting embodiment. The attachment faces are rectangular in this non-limiting example; however, this is not strictly required. As seen in FIG. 2, mass timber member 21 has a pair of spaced-apart sides 31 and 33 extending between top 24 and bottom 26 thereof. For each mass timber member, attachment face 32 thereof spans sides, top and bottom thereof.

Mass timber members 21 and 22 may be manufactured off-site. The mass timber members may comprise a plurality of layers of wood fastened together via glue, dowels, fasteners (nails, screws etc.) or the like, and which are engineered for high strength. Mass timber, including its various parts and functionings, is known per se and may comprise a third party product. Mass timber members 21 and 22 will accordingly not be described in further detail.

Mass timber assembly 20 includes a connector assembly, in this example a beam connector 36. The beam connector comprises two parts: first and second connector members 38 and 38.1. Each of the connector members is substantially the same in shape and function. Thus, like parts of second connector member 38.1 seen in FIGS. 1 and 5 to 7 have like numbers and functions as first connector member 38 seen in FIGS. 1 to 4 with the addition of decimal extension "0.1".

The connector members are each substantially planar in this non-limiting embodiment. Connector members 38 and 38.1 in this non-limiting example are made of metal, in this case aluminium; however, this is not strictly required and other types of metals or non-metal materials may be used in other embodiments. The connector member may be made of metal plate; however, here too this is not strictly required.

Referring to FIG. 8, connector members 38 and 38.1 in this non-limiting embodiment may comprise parts that are machine milled from a single solid element, in this non-limiting example a metal block, in this case an aluminium block or element 39. The element may be in a rectangular prism in outer shape. Element 39 may be cut diagonally as shown by numeral 39A to form to sub-portions 39B and 39C which are later machine milled into connector members 38 and 38.1 as seen in FIG. 1 by removing excess material 39D, 39E, 39F and 39G in the form of triangular prisms, for example. However, this is not strictly required and connector members 38 and 38.1 may be manufactured or formed in other ways in other embodiments.

For example and referring to FIG. 9, the connector members may in another non-limiting embodiment be made from two solid parts of elements, in this non-limiting example, two metal blocks, in this case two aluminum blocks or elements 41 and 43. The elements may each be in the shape of an rectangular prism in one non-limiting example. In this embodiment, excess material 41A and 43A may be removed in the shape of rectangular prisms in one-non-limiting embodiment. However, here too this is not strictly required and connector elements 39 and 39.1 may be made or formed by yet other manners in other non-limiting embodiments. As a yet further alternative, the connector elements may be manufactured/formed via welding at least in part and/or additive manufacturing at least in part for example.

As seen in FIG. 2, each connector member 38 is elongate and has and/or extends along a first or longitudinal axis 40. The longitudinal axes of the connector members in this non-limiting embodiment extend perpendicular to longitudinal axis 29 of mass timber members 21 and 22 seen in FIG. 1; however, this is not strictly required. Referring back to FIG. 2, each connector member 38 has a first side 42 and a second side 44 spaced-apart from the first side thereof. For each connector member, the sides thereof are longitudinally extending and in this non-limiting example extend parallel to longitudinal axis 40 thereof. As seen in FIG. 1, for each connector member 38, each side 42 thereof is L or J shaped or an upside/reverse L or J shape; however, this is not strictly required.

Figure 3:
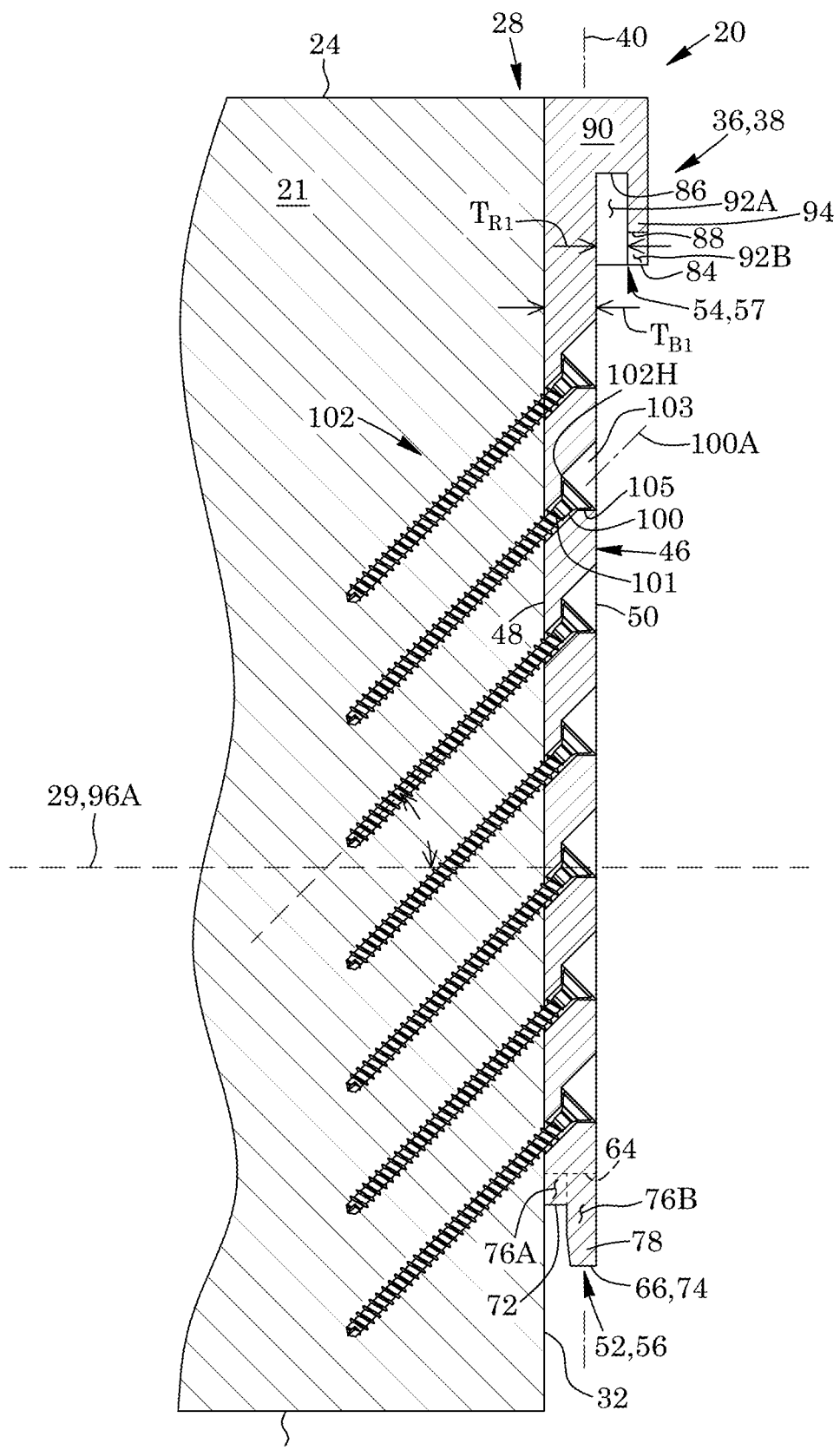
FIG. 3 is a sectional view taken along lines 3-3 of the first mass timber member and first connector member of FIG. 2, with a plurality of angled fasteners being shown coupling together the first mass timber member and the first connector member.

As seen in FIG. 3, each connector member 38 includes a body 46. The body is made of metal plate in this non-limiting example; however, this is not strictly required. For each connector member 38, body 46 thereof has a proximal or inner face or surface, in this example an inner support surface 48. For each connector member, the body thereof has a distal or outer face or surface, in this example an outer support surface 50 spaced-apart from the inner support surface thereof. As seen in FIG. 1, outer support surfaces 50 and 50.1 of connector members 38 and 38.1 are shaped to extend flush and/or adjacent with each other when the connector members are coupled together.

Referring back to FIG. 3, for each connector member 38, body 46 thereof has a laterally-extending thickness $T_{B1}$ extending between inner support surface 48 and outer support surface 50 thereof. For each connector member, the inner and outer support surfaces thereof extend between sides 42 and 44 thereof seen in FIG. 2. Each connector member 38 (and/or inner support surface 48 thereof) is shaped to substantially span and cover attachment face 32 of its corresponding mass timber member 21. Sides 42 and 44 of the connector member are thus configured to be adjacent to respective sides 31 and 33 of corresponding mass timber member 21 in this non-limiting example. Each connector member 38 is rectangular in end profile in this non-limiting example; however, this is not strictly required. Inner support surface 48 and outer support surface 50 of connector member 38 seen in FIG. 3 are rectangular in this non-limiting embodiment, as seen by the outer support surface shown in FIG. 2.

Still referring to FIG. 2, each connector member includes a first end portion 52 and a second end portion 54 spaced-apart from the first end portion thereof. For each connector member 38, the end portions thereof extend between sides 42 and 44 thereof. As seen in FIG. 3, for each connector member, inner support surface 48 and outer support surface 50 thereof extend between end portions 52 and 54 thereof. As seen in FIG. 2, the end portions extend longitudinally outwards from body 46. Longitudinal axis 40 of connector member 38 extends between end portions 52 and 54 of the connector member. For each connector member, the end portions thereof are integrally connected to body 46 thereof so as to form a unitary whole in this non-limiting example; however, this is not strictly required. Each connector member 38 has a second or lateral axis 55. End portions 52 and 54 extend parallel at least in part to the lateral axis of the connector in this non-limiting example. Lateral axis 55 of connector member 38 extends orthogonal to longitudinal axis 29 of mass timber members 21 and 22 seen in FIG. 1 in this example.

Referring back to FIG. 2, each connector member includes a protrusion 56 and a receptacle 57 spaced-apart therefrom, with each extending from first side 42 to second side 44 thereof and with each being curved in a direction extending between the sides thereof. As seen in FIG. 1, first connector member 38 is shaped to selectively couple with second connector member 38.1: in this example the first connector member is shaped to receive in part the second connector member and the second connector member is shaped to receive in part the first connector member. In this non-limiting embodiment receptacle 57 of first connector member 38 is shaped to receive protrusion 56.1 (and/or first end portion 52.1) of second connector member 38.1 and receptacle 57.1 of the second connector member is shaped to receive protrusion 56 (and/or first end portion 52) of first connector member 38. The following is a non-limiting embodiment which achieves this functionality.

As seen in FIG. 2, for each connector member 38, first end portion 52 thereof is outwardly curved laterally in a direction extending between the sides thereof in this example. For each connector member, protrusion 56 thereof is adjacent the first end portion thereof. For each connector member, the protrusion thereof is axially outwardly-extending in this non-limiting example. For each connector member 38, protrusion 56 thereof extends between sides 42 and 44 thereof. The protrusion has spaced-apart sides 58 and 60 which align with and/or are adjacent to first side 42 and second side 44 of connector member 38 as well as sides 31 and 33 of mass timber member 21, respectively. Each protrusion 56 has an outer width $W_P$ extending between sides 58 and 60 thereof.

Figures 10A, 10B:
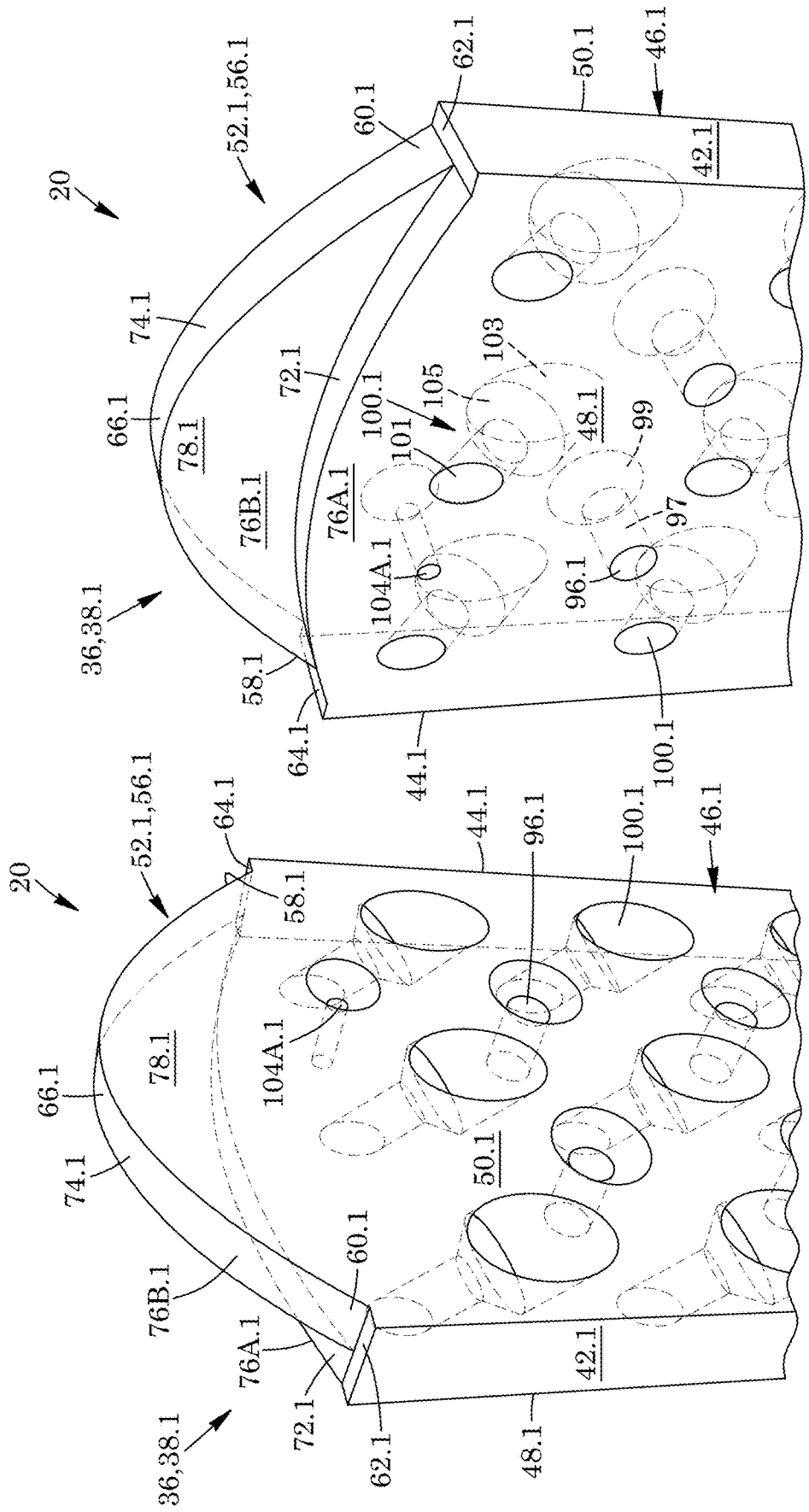
FIG. 10A is an outer/front, top, right side perspective view of the second connector member of FIG. 5 showing a protrusion thereof, the second connector member being shown in fragment.
FIG. 10B is an inner/rear, top, right side perspective view of the second connector member of FIG. 5 showing the protrusion thereof, the second connector member being shown in fragment.

In this non-limiting example connector member 38 includes a first pair of shoulders 62 and 64. Shoulder 62 extends between side 58 of protrusion 56 and side 42 of connector member 38 and shoulder 64 extends between side 60 of the protrusion and side 44 of the connector member. However, this is not strictly required. Shoulders 62 and 64 extend laterally and in this example perpendicular to longitudinal axis 40 of connector member 38. As seen in FIG. 10A, the shoulders extend between from inner support surface 48.1 to outer support surface 50.1. The shoulders are rectangular in end profile in this non-limiting embodiment. Referring back to FIG. 2, protrusion 56 has an outer end or apex 66 which is axially outwardly spaced from sides 58 and 60 thereof and body 46. The protrusion is shaped to be inwardly spaced from bottom 26 of mass timber member 21 in this non-limiting embodiment.

Each protrusion 56 is arc-shaped in front profile, being arc-shaped laterally in a direction 68 extending between sides 58 and 60 thereof, between sides 42 and 44 of connector member 38 and/or between sides 31 and 33 of mass timber member 21. Each protrusion 56 is thus arc-shaped relative to lateral axis 55.

Figure 4:
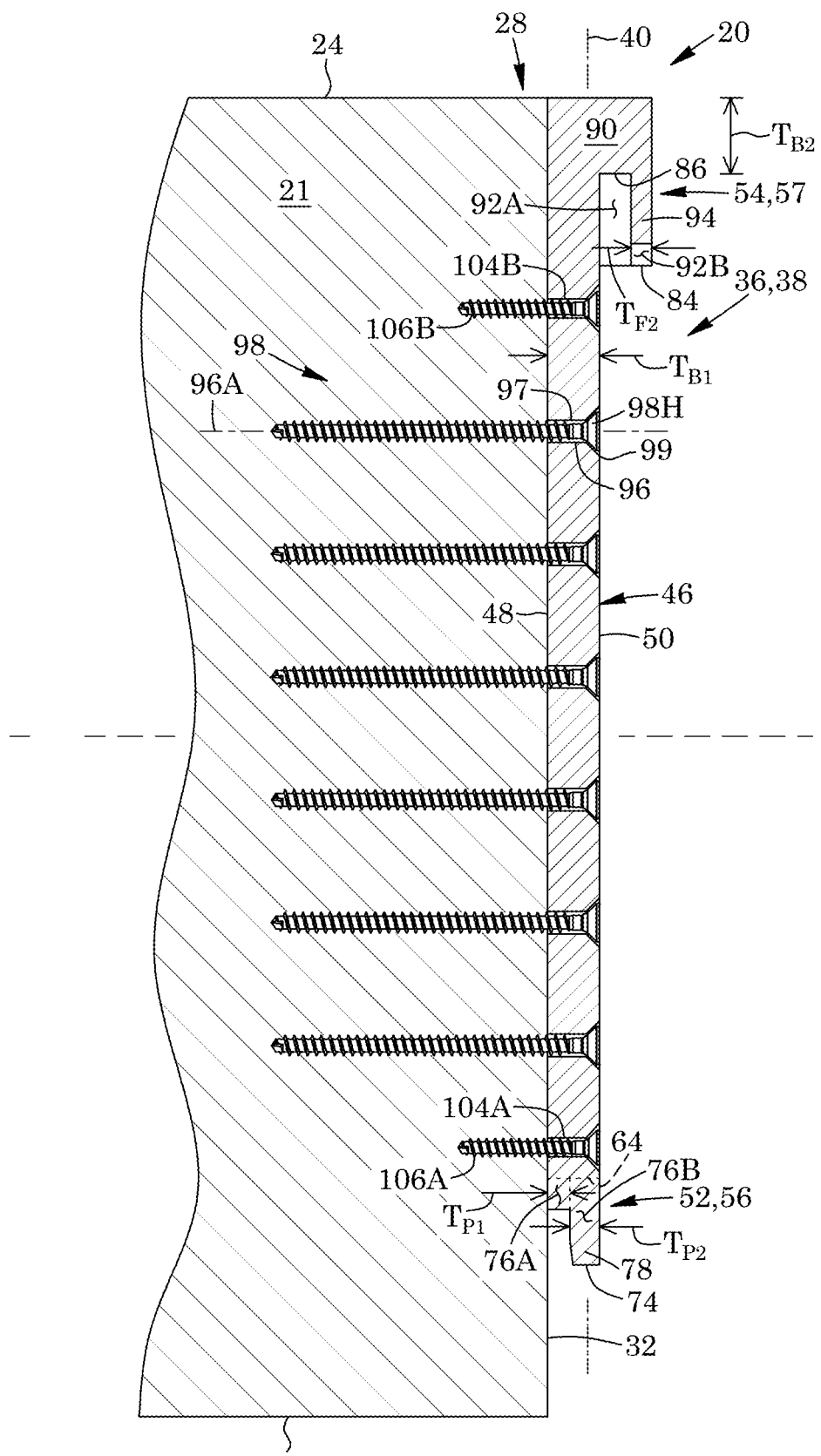
FIG. 4 is a sectional view taken along lines 4-4 of the first mass timber member and first connector member of FIG. 2, with a plurality of orthogonal fasteners being shown further coupling together the first mass timber member and the first connector member.
Figure 5:
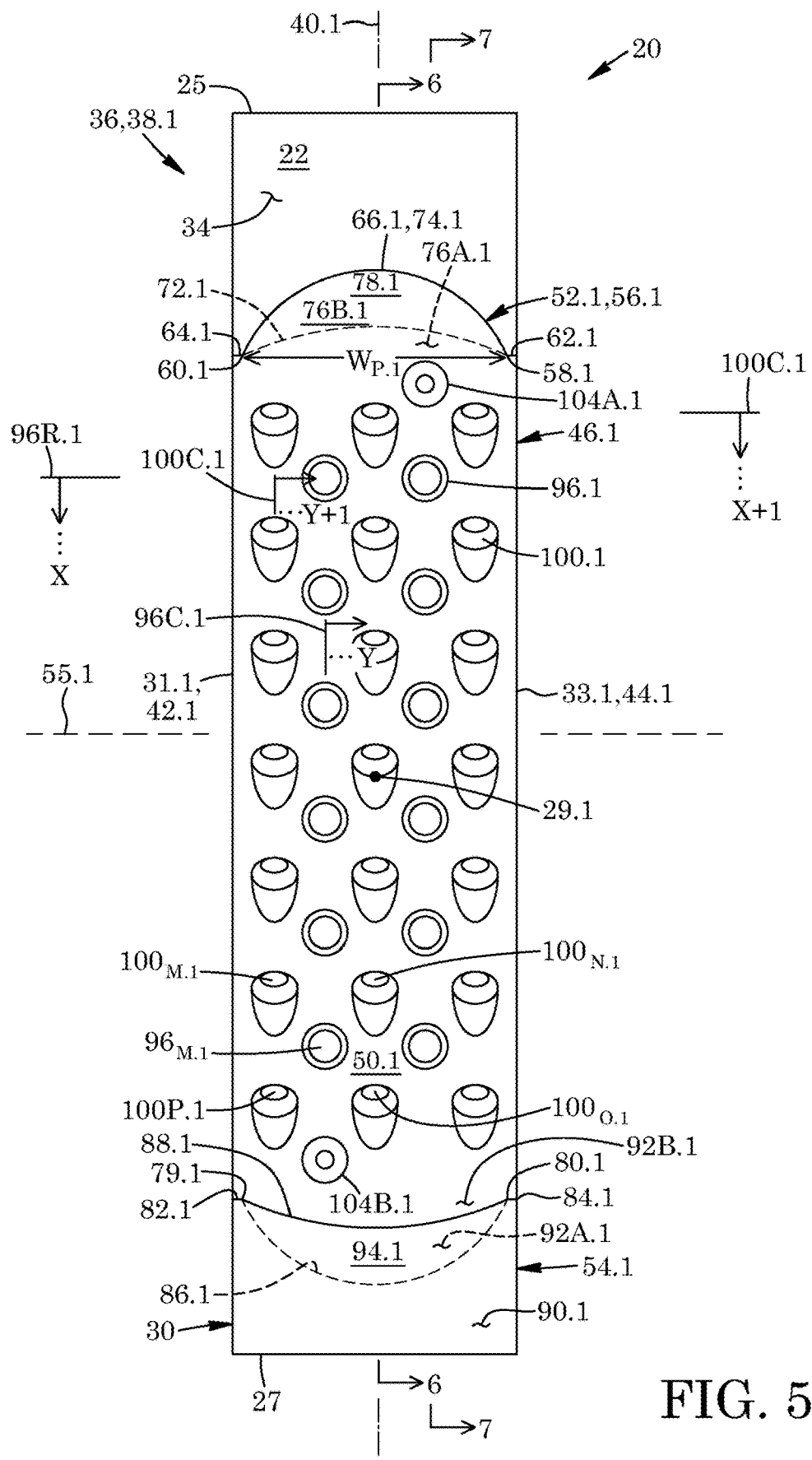
FIG. 5 is an end elevation view of the second mass timber member of FIG. 1 and an outer elevation view of the second connector member of FIG. 1 coupled thereto, with fasteners via which the second mass timber member and the second connector member couple together not being shown.

Each protrusion in this non-limiting embodiment has a pair of divergent surfaces which meet at or adjacent sides 58 and 60 thereof, in this example a laterally-extending inner curved surface 72 and a laterally-extending outer curved surface 74 axially spaced from the inner curved surface thereof. For each protrusion the inner and outer curved surfaces thereof are outwardly convex in this non-limiting example. For each protrusion 56, inner curved surface 72 and outer curved surface 74 thereof are continuous in this non-limiting embodiment. For each protrusion the inner curved surface thereof has a radius of curvature which is greater than that of the outer curved surface thereof in this example. For each protrusion 56, inner curved surface 72 and outer curved surface 74 are arranged to form a U-shape in front profile in this non-limiting embodiment, in this example a lens-shape: in a further non-limiting example a meniscus lens, in this case a converging meniscus lens type shape. However, this is not strictly required and in other embodiments surface 72 may be planar, for example. Referring to FIG. 4, inner curved surface 72 extends from inner support surface 48 towards outer support surface 50 of connector member 38. Outer curved surface 74 extends from the outer support surface towards the inner support surface of the connector member.

Still referring to FIG. 4, each protrusion 56 may be said to comprise a first sub-portion 76A which is arc-shaped and/or a circular segment in front profile and which extends from inner support surface 48 towards outer support surface 50. The first sub-portion of protrusion 56 has a laterally-extending thickness $T_{P1}$. First sub-portion 76A is generally rectangular in side or lateral profile in this non-limiting embodiment.

Each protrusion 56 may be said to comprise a second sub-portion 76B coupled to and extending laterally and axially outwards from first sub-portion 76A thereof. The sub-portions of the protrusion are integrally connected together so as to form a unitary whole in this non-limiting example. First sub-portion 76A and second sub-portion 76B of protrusion 56 comprise and thus may be referred to as a pair of male members. The second sub-portion of the protrusion is arc-shaped and/or a circular segment in front profile and extends from inner support surface 48 towards outer support surface 50. Second sub-portion 76B of protrusion 56 is laterally outwardly spaced a distance equal to thickness $T_{P1}$ from the inner support surface of the connector member in this non-limiting example. For each protrusion 56 the second sub-portion thereof may be larger in extent/span compared to first sub-portion 76A thereof; however this is not strictly required. For each protrusion the second sub-portion thereof has a laterally-extending thickness $T_{P2}$ which in this non-limiting example is larger than thickness $T_{P1}$ of first sub-portion 76A thereof; however, this too is not strictly required. Second sub-portion 76B of protrusion 56 is generally rectangular in side or lateral profile in this non-limiting embodiment. The protrusion as a whole may thus be said to be L-shaped in side or lateral profile in this non-limiting example. As seen in FIG. 3, sub-portion 76B of protrusion 56 includes in this non-limiting embodiment a distal end portion 78 that tapers outwards at least in part and relative to longitudinal axis 40.

Referring to FIG. 1, for each connector member 38, receptacle 57 thereof is shaped to selectively mate with, receive and in this example snugly abut with corresponding protrusion 56.1 of another connector member 38.1 adjacent second end portion 54 thereof. The following is a non-limiting embodiment which achieves this functionality.

As seen in FIG. 2, for each connector member 38, receptacle 57 thereof extends from first side 42 to second side 44 thereof. The receptacle has sides 79 and 80 which align with and/or are adjacent to the first side and second side of its connector member, respectively, as well as sides 31 and 33 of mass timber member 21, respectively. In this non-limiting example connector member 38 includes a second pair of shoulders 82 and 84. Shoulder 82 extends between side 79 of receptacle 57 and side 42 of connector member 38 and shoulder 84 extends between side 80 of the receptacle and side 44 of the connector member. However, this is not strictly required. Shoulders 82 and 84 extend laterally and in this example perpendicular to longitudinal axis 40 of connector member 38. As seen in FIG. 11A, the shoulders are rectangular in end profile in this non-limiting embodiment. The first pair of shoulders 62 and 64 of first connector member 38 seen in FIG. 2 are shaped to abut with and extend flush/parallel with the second pair of shoulders 82.1 and 84.1 of second connector member 38.1 seen in FIG. 11A when the connector members are coupled together.

Referring back to FIG. 2, each receptacle 57 is arc-shaped in front profile, being arc-shaped laterally in direction 68 extending between sides 79 and 80 thereof, between sides 42 and 44 of connector member 38 and/or between sides 31 and 33 of mass timber member 21. Each receptacle is thus arc-shaped relative to lateral axis 55.

Each receptacle 57 in this non-limiting embodiment has a pair of divergent surfaces which meet at or adjacent sides 79 and 80 thereof, in this example a laterally-extending inner curved surface 86 and a laterally-extending outer curved surface 88 axially spaced from the inner curved surface thereof. However, this is not strictly required and in other embodiments the inner curved surface may be planar, for example. As seen in FIG. 3, inner curved surface 86 extends laterally outwards from outer support surface 50 of connector member 38. Outer curved surface 88 is laterally-extending and laterally spaced from body 46.

Referring back to FIG. 2, for each receptacle 57, inner curved surface 86 and outer curved surface 88 thereof are outwardly concave in this non-limiting example. For each receptacle, inner curved surface 86 and outer curved surface 88 thereof are continuous in this non-limiting embodiment. For each receptacle 57, the outer curved surface thereof has a radius of curvature which is greater than that of the inner curved surface thereof in this example. Inner curved surface 86 of the receptacle has a radius of curvature substantially equal to that of outer curved surface 74 of protrusion 56 in this example. Outer curved surface 88 of receptacle 57 has a radius of curvature substantially equal to that of inner curved surface 72 of protrusion 56 in this example. For each receptacle, inner curved surface 86 and outer curved surface 88 thereof are arranged to form a U-shape in front profile as seen in FIG. 2 and a U-shape in side or lateral profile as seen in FIG. 3 in this non-limiting embodiment.

Still referring to FIG. 3, each receptacle 57 includes a base portion 90 which extends laterally outwards from body 46. The base portion is integrally connected to the body so as to form a unitary whole in this non-limiting example. Base portion 90 is a rectangular prism in shape in this non-limiting embodiment. As seen in FIG. 4, the base portion has a longitudinally-extending thickness $T_{B2}$ which is at least equal to and in this example greater than thickness $T_{B1}$ of body 46 seen in FIG. 3 in this example. Base portion 90 of receptacle 57 in this non-limiting example is shaped to extend flush with top 24 of its corresponding mass timber member 21 in this non-limiting embodiment.

As seen in FIG. 2, the base portion of the receptacle includes a recessed portion 92A. The recessed portion is curved at least in part. Recessed portion 92A is arc-shaped and/or a circular segment in front profile in this non-limiting embodiment. The recessed portion extends laterally outwards from outer support surface 50 of connector member 38 as seen in FIG. 3, between sides 79 and 80 of receptacle 57 seen in FIG. 2 and from adjacent outer curved surface 88 to adjacent inner curved surface 86 in this non-limiting example. Still referring to FIG. 2, recessed portion 92A is lens-shaped in this non-limiting embodiment, in this case a meniscus lens, in this example a converging meniscus lens type shape; however, this is not strictly required. As seen in FIG. 3, the recessed portion is generally rectangular in side or lateral profile in this non-limiting embodiment.

Referring now to FIG. 1, recessed portion 92A of connector member 38 is shaped to receive, in this example fully/snugly receive second sub-portion 76B.1 of protrusion 56.1 of connector member 38.1. Outer curved surface 74 of protrusion 56 of connector member 38 is shaped to extend along and abut inner curved surfaces 86.1 of receptacle 57.1 of connector member 38.1. Referring to FIG. 3, recessed portion 92A of receptacle 57 has a laterally-extending thickness $T_{R1}$. The thickness of recessed portion of the receptacle is shaped to be equal to or greater than (in this example slightly greater than and/or substantially the same in size as) thickness $T_{R2}$ of second sub-portion 76B of protrusion 56 seen in FIG. 4. Tapered distal end portion 78 of protrusion 56 may function to facilitate insertion of second sub-portion 76B of the protrusion into recessed portion 92A.1 of receptacle 57.1 of a corresponding paired connector member 38.1 seen in FIG. 1.

Referring back to FIG. 4, receptacle 57 includes an outer portion, lip or flange 94 coupled to and extending axially inwards/downwards from base portion 90 thereof towards protrusion 56. The flange in this non-limiting embodiment integrally connects to the base portion of the receptacle so as to form a unitary whole. Flange 94 extends laterally and is outwardly spaced from body 46. The flange in lateral section extends parallel to longitudinal axis 40 in this non-limiting example. Body 46, base portion 90 and flange 94 enclose and define recessed portion 92. Outer curved surface 88 may be said to be a part of the flange. Referring to FIG. 2, flange 94 has a shape in profile which mirrors second sub-portion 76B of protrusion 56 in this example. The flange is arc-shaped and/or a circular segment in front profile and extends from outer curved surface 88 to inner curved surface 86. Flange 94 is generally rectangular in side or lateral profile in this non-limiting embodiment as seen in FIG. 3.

As seen in FIG. 11A, base portion 90.1 of receptacle 57.1 includes a second recessed portion 92B.1 adjacent outer curved surface 88.1. The recessed portion extends downwards from shoulders 82.1 and 84.1 towards the base portion of the receptacle. Recessed portion 92B.1 is arc-shaped and/or a circular segment in front profile in this non-limiting embodiment. Recessed portion 92B.1 is in fluid communication with and smaller in extent than recessed portion 92A.1. Recessed portion 92B.1 is lens-shaped in this non-limiting embodiment, in this case a meniscus lens, in this example a converging meniscus lens type shape; however, this is not strictly required. As seen in FIG. 3, the recessed portion is generally rectangular in side or lateral profile in this non-limiting embodiment. Referring back to FIG. 11A, recessed portions 92.1A and 92.1B of receptacle 57.1 of connector member 38.1 are shaped to snugly receive and abut with corresponding sub-portions 76A and 76B of connector member 38 seen in FIG. 1. The recessed portions of the receptacle may be referred to as a pair of female members.

Referring back to FIG. 3, flange 94 of receptacle 57 is laterally outwardly spaced a distance equal to thickness $T_{R1}$ of recessed portion 92 of the receptacle in this non-limiting example. As seen in FIG. 4, for each receptacle, flange 94 thereof has a laterally-extending thickness $T_{F2}$ in this non-limiting example. Thickness $T_{P1}$ of sub-portion 76A of protrusion 56 is shaped to be equal to or greater than (in this example slightly greater than and/or substantially the same in size as) thickness $T_{F2}$ of flange 94 in this example. Receptacle 57 as a whole may thus be said to be C-shaped in side or lateral profile in this non-limiting example.

As seen in FIGS. 3 and 4, mass timber assembly 20 in this non-limiting embodiment includes a plurality of fasteners. However, this is not strictly required and the mass timber assembly may use third party fasteners in other embodiments.

The fasteners are configured to couple connector members 38 and 38.1 seen in FIG. 1 to respective end and/or attachment faces 32 and 34 of mass timber members 21 and 22, respectively. First connector member 38 is thus configured to selectively couple to first mass timber member 21 via fasteners and second connector member 38.1 is configured to selectively couple to second mass timber member 22 via fasteners. The connector members are thus configured to selectively couple together first mass timber member 21 and second mass timber member 22. Connector members 38 and 38.1 so coupled to the mass timber members and each other, are configured to withstand loads between the mass timber members such as gravity, tension and/or compression loads, for example. The following is a non-limiting embodiment which achieves this functionality.

As seen in FIG. 2, each connector member 38 has one or more first fastener apertures, in this example a first plurality of apertures 96. As seen in FIG. 4, the first plurality of apertures extend along or parallel to a first axis 96A. The first axis extends parallel to longitudinal axis 29 of mass timber members 21 and perpendicular to longitudinal axis 40 of connector member 38. Each of the first plurality of apertures 96 may thus be referred to as orthogonal apertures.

For each connector member 38 and as seen in FIG. 2, the first plurality of apertures are evenly spaced-apart relative to each other in this non-limiting example. For each connector member, the first plurality of apertures 96 thereof align in X number of rows 96R and Y number of columns 96C between sides 42 and 44 thereof and end portions 52 and 54 thereof. For each connector member 38 the columns of apertures 96 extend parallel to the sides thereof and the rows extend laterally between the sides thereof in this non-limiting example. The first plurality of apertures comprise six rows and two columns of apertures in this non-limiting embodiment; however, other arrangements are possible in other examples. For each connector member 38 and still referring to FIG. 2, the first plurality of apertures 96 thereof extend parallel to and in this example inwardly spaced from sides 42 and 44 thereof. For each connector member, the first plurality of apertures thereof extend adjacent protrusion 56 and receptacle 57 thereof in this non-limiting embodiment. For each connector member 38, the first plurality of apertures 96 thereof are positioned in a first rectangular arrangement in this example; however, this is not strictly required.

As seen in FIG. 10A, each of the first plurality of apertures 96.1 is countersunk in this non-limiting example and may be referred to as a countersunk hole. However, this is not strictly required and the apertures may comprise counter bored holes in other non-limiting embodiments, for example. As seen in FIG. 10B, each aperture 96.1 comprises a first or inner bore 97 extending from inner support surface 48.1 towards outer support surface 50.1 and a second or outer bore 99 in fluid communication with the inner bore and extending from the outer to the inner support surface.

As seen in FIG. 4, the first plurality of apertures 96 are arranged to receive a first set or plurality of fasteners 98 therethrough. The first plurality of fasteners are thus positioned to extend orthogonal to connector member 38 and parallel to longitudinal axis 29 of mass timber members 21. First plurality of fasteners 98 may be referred to as orthogonal fasteners.

Figure 14:
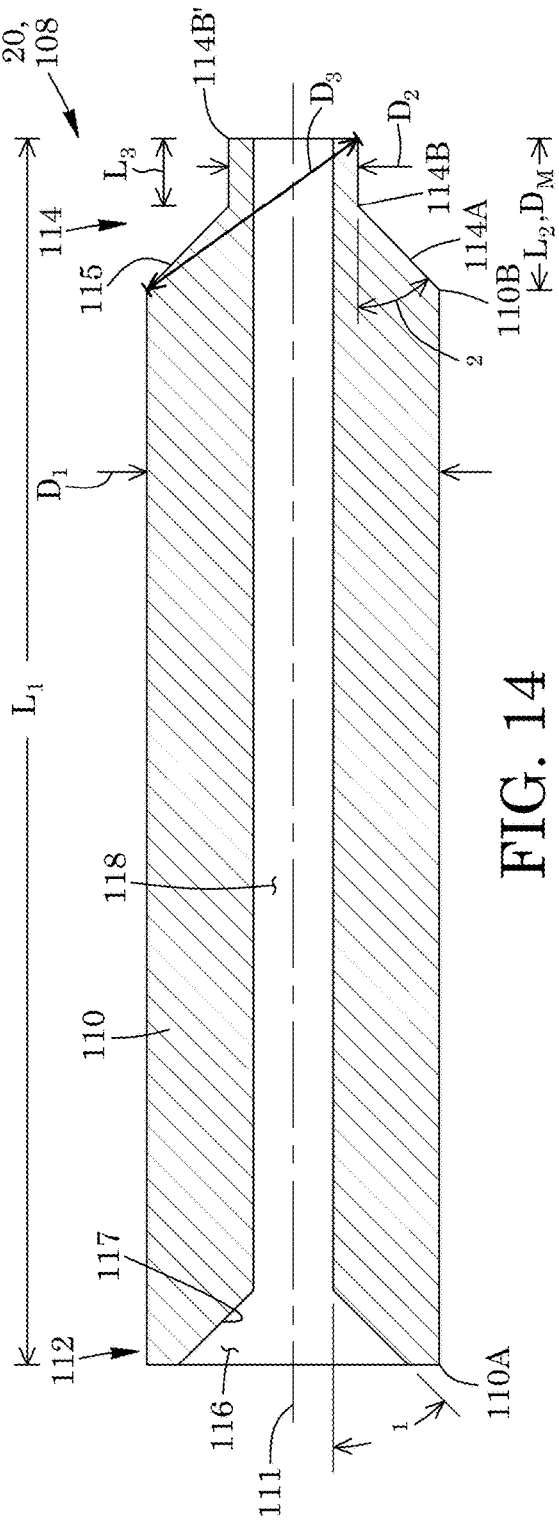
FIG. 14 is a longitudinal sectional view of the drill jig of FIG. 12.

As seen in FIG. 14, mass timber assembly 20 includes in this example a drill jig 108. The drill jig is configured to facilitate drilling of holes 109 (which may be pilot holes) seen in FIG. 7 into mass timber members 22. Referring back to FIG. 14, drill jig 108 includes a body 110 that is elongate and tubular in this non-limiting example. The body has a diameter $D_1$. Body 110 has a first or proximal end 110A, a second or distal end 110B spaced-apart from the proximal end thereof and a longitudinal axis 111 extending between the ends thereof.

Drill jig 108 has a first or proximal end portion 112 adjacent the proximal end of the body and a second or distal end portion 114 spaced-apart from the proximal end portion thereof. The first end portion of the drill jig is shaped to promote or facilitate receiving of a drill bit (not shown) therethrough, in this example via an outer bore 116. The outer bore extends/tapers from first end portion 112 towards second end portion 114 of drill jig 108. An inner, tapered, annular surface 117 of the drill jig extends about outer bore 116. Surface 117 extends angularly outwards at an angle $\beta_1$ relative to axis 111. Angle $\beta_1$ is an acute angle in this example, in this case being equal to 45 degrees in this non-limiting embodiment. However, this is not strictly required and angle $\beta_1$ may be equal to other amounts in other examples.

Drill jig 108 has a second or primary bore 118 shaped to snugly receive the drill bit therethrough. The primary bore extends through body 110 between ends 110A and 110B thereof, from second end portion 114 towards first end portion 112 of the drill jig. Bores 116 and 118 are in fluid communication. Alternatively, drill jig 108 may be said to comprise a single bore extending therethrough and which is outwardly enlarged or flared adjacent proximal end 110A of the body. Bore 118 is configured to inhibit use of drill bits which exceed a pre-determined size and/or diameter. The bore is thus sized with a diameter generally or substantially equal to a predetermined threshold of acceptable drill bit.

Figure 13:
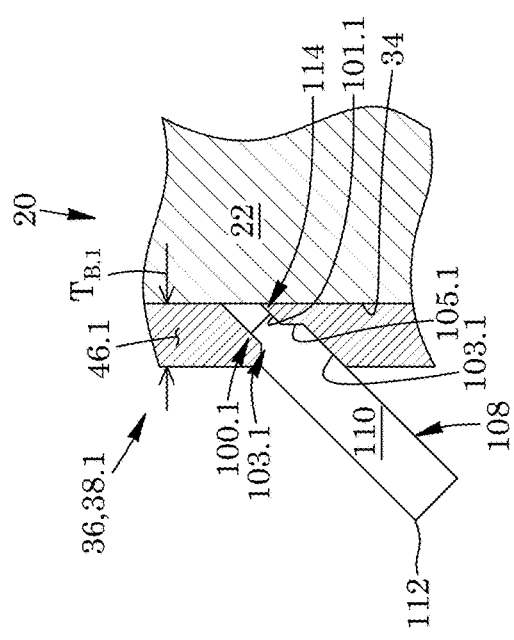
FIG. 13 is a sectional view similar to FIG. 7 of the second mass timber member and second connector member of FIG. 7, together with the drill jig of FIG. 12 extending into one of a second plurality of apertures of the second connector member to facilitate drilling an orthogonal pilot hole into the second mass timber member.

Second end portion 114 of drill jig 108 is shaped to snugly fit within and mate with respective countersunk apertures 96.1 of connector members 38.1 seen in FIG. 13. The drill jig is configured to selectively mate with respective countersunk apertures so as to inhibit movement of the drill jig relative to beam connector 36 (or connector member 38.1 thereof). Referring back to FIG. 14, each second end portion 114 of drill jig 108 includes a first or proximal sub-portion 114A and a second or distal sub-portion 114B coupling to and extending outwards from distal end 110B of body 110. The distal sub-portion is sleeve-shaped or tubular in this non-limiting example. Distal sub-portion 114B has a diameter $D_2$ which is less than diameter $D_1$ of body 110. The distal sub-portion is shaped to be substantially equal to or slightly smaller than inner bore 97.1 of a respective aperture 96.1 seen in FIG. 13.

Referring back to FIG. 14, proximal sub-portion 114A couples to and extends between distal sub-portion 114B and body 110. The proximal sub-portion is flared and/or an angled shoulder in shape. Proximal sub-portion 114A is frustoconical in outer shape in this example. The proximal sub-portion is shaped to snugly fit with/within-at-least-in-part and be substantially equal or slightly smaller than outer bore 99.1 of a respective aperture 96.1 seen in FIG. 13. Referring back to FIG. 14, proximal sub-portion 114A has an outer, tapered, annular surface 115. Surface 115 extends angularly outwards at an angle $\beta_2$ relative to axis 111. Angle $\beta_2$ is an acute angle in this example, in this case being equal to within 2 degrees of angle $\beta_1$ according to one preferred embodiment, and being within 1 degree of angle $\beta_1$ according to another preferred embodiment; however, this is not strictly required Angle $\beta_2$ is equal to 44 degrees in this non-limiting embodiment; however, this is not strictly required and angle $\beta_2$ may be equal to other amounts in other examples.

Figure 12:
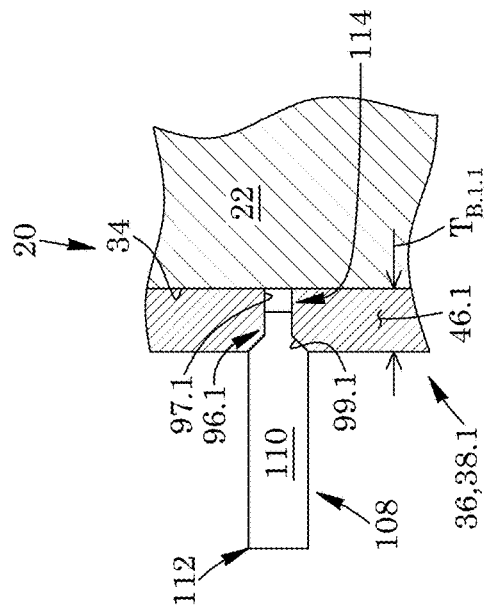
FIG. 12 is a sectional view similar to FIG. 6 of the second mass timber member and second connector member of FIG. 6, together with a drill jig according to one aspect, the drill jig being shown extending into one of a first plurality of apertures of the second connector member to facilitate drilling of an angled pilot hole into the second mass timber member.

Second end portion 114 of drill jig 108 is shaped to extend into respective apertures 96.1 and 100.1 of connector member 38.1 seen in FIGS. 12 and 13 without interfering with and/or abutting corresponding mass timber member 22. As seen in FIG. 14, the second end portion has a length $L_2$ which is equal to less than thickness $T_{B1}$ of body 46.1 of connector member 38.1 seen in FIG. 13. Referring back to FIG. 14, maximal distance $D_M$ between end 110B of body 110 and distal end 114B' of distal sub-portion 114B is equal to or less than thickness $T_{B1}$ of body 46.1 of connector member 38.1 seen in FIG. 12 in this example. Referring back to FIG. 14, distal sub-portion 114B of end portion 114 of drill jig 108 has a length $L_3$ extending from proximal sub-portion 114A to distal end 114B' thereof. Length $L_3$ may be variable so as to accommodate connector members 38.1 seen in FIG. 13 comprising bodies 46.1 of different thicknesses $T_{B1.1}$. Referring back to FIG. 14, distal sub-portion 114B of end portion 114 of drill jig 108 may thus be configured/shaped to have a length thereof which is a function of the thickness of a given said connector member.

Drill jig 108 may thus be referred to as a precision pre-drill and/or installation jig suitable to engage with the provided reamed out countersink holes or apertures 96.1 seen in FIG. 13. The drill jig is configured to assist in precision installation of connector members 38.1, which may be particularly advantageous for accommodating and/or resulting in higher capacity systems.

Beam connector 36 may comprise a higher capacity system and installation precision and sequence may thus be critical, so that the position and load sharing function between fasteners is certain and group action effects are reduced or eliminated. Drill jig 108 is configured to assist in aligning the desired installation angle within a minimal tolerance. Further, the drill jig is configured to assure proper, perpendicular fastener head seating into the beam hanger's routed holes or apertures 96.1 seen in FIG. 13. Drill jig 108 is designed to substantially fit the exact drill bit diameter suitable for pre-drilling of the specified structural fastener. Additionally, the drill jig has a length $L_1$ seen in FIG. 14 extending between end portions 112 and 114 thereof, which facilitates gripping/holding thereof via a relatively large hand footprint e.g. for a worker wearing gloves. Drill jig 108 is thus configured to promote gripping thereof by a gloved hand. The specific pilot hole diameter so configured/enabled via drill jig 108 may function to inhibit or avoid the risks of pre-drilling with an oversized drill bit. The latter may result in accidentally reducing the specified structural capacity of the system. Drill jig 108 is thus shaped/configured to promote angular positioning of a pilot hole along which a fastener subsequently extends for coupling beam connector 36 to mass timber member 22.

Referring now to FIG. 2, each connector member 38 has one or more second fastener apertures, in this example a second plurality of apertures 100. Each of the second plurality of apertures 100 is countersunk in this non-limiting example and may be referred to as a countersunk hole; however, this is not strictly required and the apertures may comprise counter bored holes in other non-limiting embodiments, for example. As seen in FIG. 3, the second plurality of apertures 100 extend along or parallel to a second axis 100A. The second axis is angled relative to first axis 96A by an angle $\alpha$ and thus angled relative to longitudinal axis 29. Angle $\alpha$ is non-perpendicular and in this example acute in this non-limiting embodiment; however, the latter is not strictly required. Second set of apertures 100 may thus be referred to as angled apertures. As seen in FIG. 10B, each aperture 100.1 in this non-limiting embodiment comprises a first or inner bore 101 extending outwards from inner support surface 48.1 towards outer support surface 50.1, a second or outer bore 103 in fluid communication with the inner bore and extending from the outer to the inner support surface and a third or intermediate bore 105 in fluid communication with and extending between the inner and outer bores. The inner bore is shaped to receive a shaft and/or threaded portions of a fastener therethrough. Outer bore 103 is tubular in shape in this non-limiting embodiment and triangular in lateral profile as seen in FIG. 3. Referring back to FIG. 10B, intermediate bore 105 tapers in a direction extending from the outer bore to inner bore 101 and is shaped to receive a fastener head. Bores 101, 103 and 105 of apertures 100.1 are angled in this example. Each aperture 100.1 is elliptical-shaped in front and rear profile in this non-limiting example.

Referring to FIG. 14, distal sub-portion 114B of drill jig 108 is shaped to be substantially equal to or slightly smaller than inner bore 101.1 of a respective aperture 100.1 seen in FIG. 12. Referring back to FIG. 14, proximal sub-portion 114A is shaped to snugly fit with/within-at-least-in-part and be substantially equal or slightly smaller than outer bore 103.1 of a respective aperture 100.1 seen in FIG. 12. The advantages of drill jig 108 so configured and discussed above for apertures 96.1 and facilitating pilot holes into mass timber member 22 related thereto, equally apply for facilitating precision installation and pilot holes relating to apertures 100.1 and mass timber member 22 seen in FIG. 12. Thus the same drill jig may be used for each of the apertures of connector members 38.1.

As seen in FIG. 2, for each connector member 38, the second plurality of apertures 100 are evenly spaced-apart relative to each other in this non-limiting example. For each connector member, the second plurality of apertures thereof align in rows and columns in this non-limiting embodiment: in this example X+1 number of rows 100R and Y+1 number of columns 100C between sides 42 and 44 thereof and end portions 52 and 54 thereof. For each connector member 38 the columns of apertures 100 extend parallel to the sides thereof and the rows extend between the sides thereof in this non-limiting example. The second plurality of apertures comprising seven rows and three columns of apertures in this non-limiting embodiment; however, other arrangements are possible in other examples. For each connector member 38 and still referring to FIG. 2, the second plurality of apertures 100 thereof extend parallel, extend adjacent to and/or are inwardly spaced from sides 42 and 44 thereof in this non-limiting example. For each connector member, the second plurality of apertures thereof extend adjacent protrusion 56 and receptacle 57 thereof in this non-limiting embodiment. For each connector member 38, the second plurality of apertures 100 thereof are positioned a second rectangular arrangement in this example; however, this is not strictly required.

As seen in FIG. 2, each of the first plurality of apertures 96 is interposed between respective ones of the second plurality of apertures 100 in this non-limiting embodiment. Each of the first plurality of apertures is interposed laterally and longitudinally between respective ones of the second plurality of apertures in this example. Each of the first plurality of apertures 96 is enclosed or surrounded by a respective subgroup of the second plurality of apertures in this example: this is seen by aperture $96_M$ being surrounded by apertures $100_M$, $100_N$, $100_O$ and $100_P$.

For each connector member 38 and as seen in FIG. 3, the second plurality of apertures 100 thereof are arranged to receive a second set or plurality of fasteners 102 therethrough. The second plurality of fasteners extend along or parallel to second axis 100A and are thus angled relative to axis 29 of mass timber members 21 and fasteners 98 (seen in FIG. 4) by angle α seen in FIG. 3. Second plurality of fasteners 102 are also angled relative to longitudinal axis 40 of connector member 38. The second plurality of fasteners may be referred to as angled fasteners.

First and second plurality of fasteners 98 and 102 seen in FIGS. 3 and 4 comprise screws in this non-limiting embodiment where first and second mass timber members 21 and 22 comprise wood products. The screws in this example comprise countersunk screws. However, this is not strictly required and the fasteners may be of other types in other examples including comprising countersunk bolts in another non-limiting embodiment. Fasteners 98 and 102 and/or apertures 96 and 100 seen in FIGS. 3 and 4 are configured to ensure that fastener heads 98H and 102H thereof are flush with and/or spaced away from outer support surface 50 of connector member 38.

As seen in FIG. 4, each connector member in this non-limiting example has one or more positioning apertures, or a third plurality of apertures, in this case a first positioning aperture 104A and a second positioning aperture 104B spaced-apart therefrom. The positioning apertures extend parallel to first axis 96A, in this example horizontally and may be referred to as horizontal setting holes. Positioning apertures 104A and 104B assist in precise installation as required. The first and second positioning apertures and positioning fasteners 106A and 106B thereof, are configured to facilitate at least temporary positioning of respective connector members 38 and 38.1 with mass timber members 21 and 22 seen in FIG. 1 prior to fully coupling the connector members to the mass timber members via fasteners 98 and 102 seen in FIGS. 3 and 4 and/or coupling together the mass timber members via the connector members as described above. The following is a non-limiting embodiment which achieves this functionality.

As seen in FIG. 2, first positioning aperture 104A is positioned near or adjacent protrusion 56 and second positioning aperture 104B is positioned near or adjacent receptacle 57 in this example. In this non-limiting example, positioning apertures 104A and 104B are positioned near or adjacent opposite sides 42 and 44 of connector member 38, respectively and adjacent protrusion 56 and receptacle 57, respectively. The positioning apertures may thus be said to be at the top right and bottom left of the connector plate in this non-limiting example. However, this is not strictly required and in other embodiments, the positioning apertures may be positioned at the top left and bottom right, for example. In a further non-limiting embodiment, the first and second positioning apertures align longitudinally with each other. For each connector member 38, the first and second positioning apertures 104A and 104B are inwardly positioned from sides 42 and 44 thereof in this example. As seen in FIG. 4, the positioning apertures and positioning fasteners 106A and 106B shaped to extend therethrough, are configured in this non-limiting embodiment to extend parallel to longitudinal axis 29. Positioning apertures 104A and 104B may be referred to as setting screws for facilitating levelling with connector members 38 which are positioned plumb relative to mass timber members 21 and 22. As seen in FIG. 10A, apertures 104A.1 are countersunk in this non-limiting embodiment and configured to fit corresponding positioning fasteners which are also countersunk; however, this is not strictly required.

Referring to FIG. 13, drill jig 108 is configured to provide assistance in precise installing of setting fasteners or the positioning fasteners by enabling precision positioned pilot holes into mass timber members 22 so that load distribution among connector members 38 and 38.1 (seen in FIG. 1) when installed in double assemblies may be assured.

Still referring to FIG. 1, there is accordingly provided a method of coupling together mass timber members 21 and 22. The method includes forming a pair of connector members 38 and 38.1, each being substantially the same in shape. Within the forming step and as seen in FIG. 2, the method may include providing each connector member with protrusion 56 and receptacle 57 spaced-apart from the receptacle.

Within the forming step for each connector member 38, the method may include providing each connector member with at least two spaced-apart positioning apertures 104A and 104B arranged to receive respective one or more positioning fasteners 106A and 106B seen in FIG. 4 and inhibit movement thereof relative to a respective mass timber member 21. Within the forming step for each connector member and as seen in FIG. 2, the method may include forming the first positioning aperture thereof near or adjacent protrusion 56 thereof and forming the second positioning aperture thereof near or adjacent receptacle 57 thereof. Within the forming step for each connector member 38, the method may include positioning first and second positioning apertures 104A and 104B thereof to align longitudinally. Within the forming step for each connector member, the method may include positioning the first and second positioning apertures thereof inwardly from sides 42 and 44 thereof.

Within the forming step, the method may include providing each connector member with a plurality of apertures 96 and 100 seen in FIG. 2 to receive respective fasteners 98 and 102 seen in FIGS. 3 and 4 therethrough. This may include the first plurality of apertures seen in FIG. 4 which extend parallel to first axis 96A and the second plurality of apertures seen in FIG. 3 which extend parallel to second axis 100A which is angled relative to the first axis. Within the forming step for each connector member 38, and as seen in FIG. 2, the method may include interposing each of the first plurality of apertures 96 between respective ones of the second plurality of apertures 100. Within the forming step for each connector member, the method may include interposing each of the first plurality of apertures laterally and longitudinally between respective ones of the second plurality of apertures. Within the forming step for each connector member 38, the method may include enclosing or surrounding each of the first plurality of apertures $96_M$ by a respective subgroup of the second plurality of apertures $100_M$, $100_N$, $100_O$ and $100_P$.

Within the forming step for each connector member, the method may include aligning the first plurality of apertures 96 align in rows 96R and columns 96C and/or aligning the second plurality of apertures 100 align in rows 100R and columns 100C. Within the forming step for each connector member 38, the method may include aligning the first plurality of apertures align in X number of rows and Y number of columns and/or aligning the second plurality of apertures align in X+1 number of rows and Y+1 number of columns. Within the forming step for each connector member, the method may include spacing the first plurality of apertures 96 evenly relative to each other and/or spacing the second plurality of apertures 100 evenly relative to each other and/or relative to the first plurality of apertures.

Within the forming step for each connector member 38, the method may include positioning the first plurality of apertures to extend along and adjacent in part as well as inwardly in part from sides 42 and 44 thereof and/or positioning the second plurality of apertures to extend parallel to and inwardly from the sides thereof. Within the forming step for each connector member, the method may include positioning the first plurality of apertures 96 and/or the second plurality of apertures 100 to extend in part adjacent protrusion 56 and receptacle 57 thereof. Within the forming step for each connector member 38, the method may include positioning the first plurality of apertures in a first rectangular arrangement and/or positioning the second plurality of apertures in a second rectangular arrangement.

The method may include providing each connector member 38 with a pair of positioning apertures 104A and 106A extending therethrough. The method may include positioning the first and second plurality of apertures 96 and 100 between the positioning apertures. The method may include arranging positioning apertures 104A and 106A to be axially offset and/or near respective sides 42 and 44 of their connector member 38.

The method may include inserting end portion of 114 of drill jig 108 seen in FIG. 14 into respective positioning apertures and thereafter drilling pilot holes into the structural member or mass timber member 21 seen in FIG. 2 via the drill jig so inserted into respective ones of the positioning apertures.

Referring to FIG. 14, the method may include shaping the drill jig to facilitate receipt of a drill bit therein and therethrough. The method may include providing the drill jig with drill bit bore 118 extending therethrough and which is shaped to promote use a drill equal to or less than a predetermined threshold. Drill jig 108 may thus be configured to inhibit use a drill bit which exceeds a predetermined threshold. The method may include shaping end portion 114 of the drill jig to be frustoconical at least in part and/or sleeve shaped at least in part. The method may include shaping drill jig 108 with drill bit bore 118 having an outwardly flared opening or outer bore 116 shaped to promote receiving the drill bit therethrough.

Referring to FIG. 4, the method may include coupling each connector member 38 to its structural member or mass timber member 21 via fasteners 106A and 106B extending through positioning apertures 104A and 104B so as to promote positioning of connector member 38 relative to the mass timber member.

Figure 7:
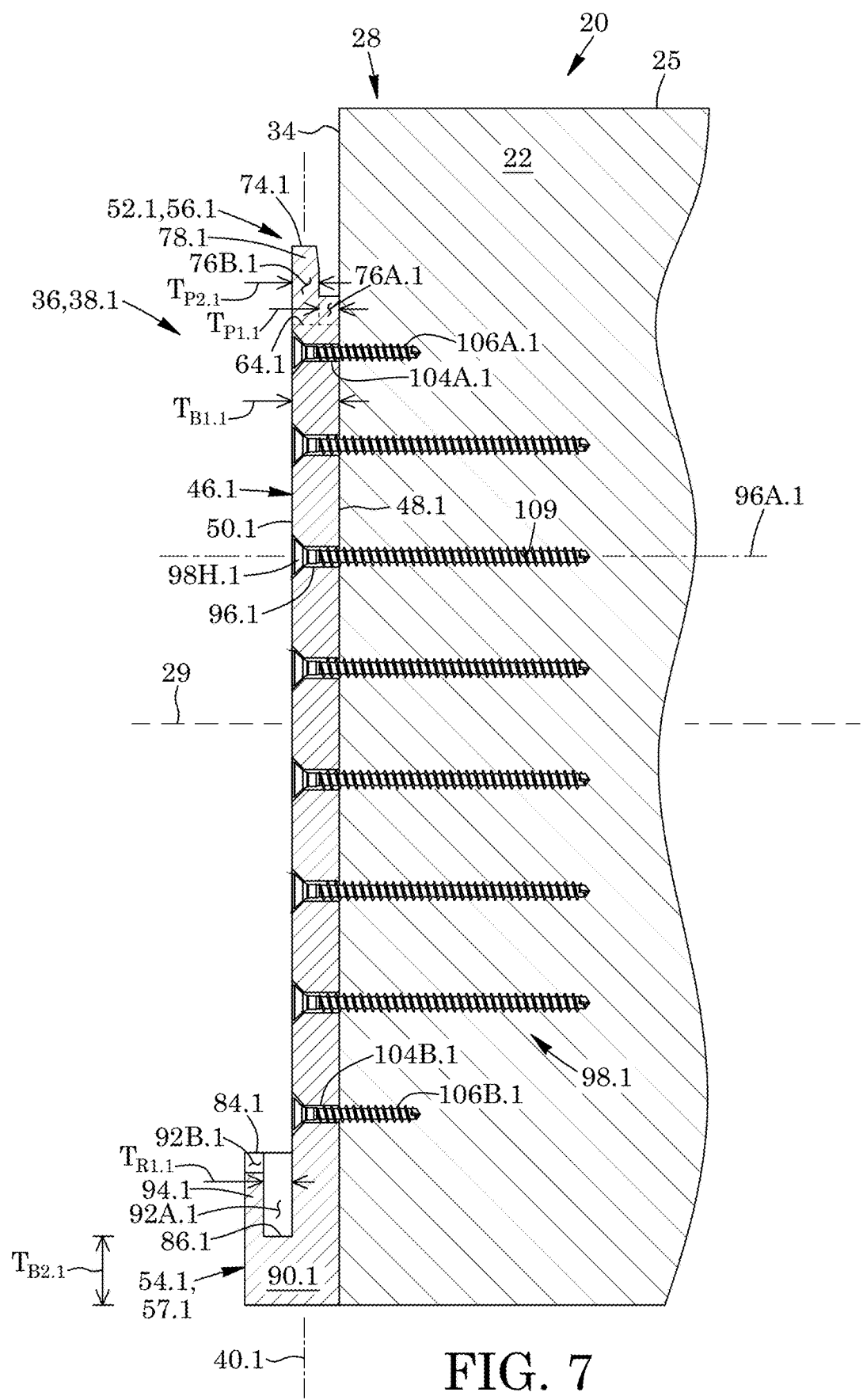
FIG. 7 is a sectional view taken along lines 7-7 of the second mass timber member and second connector member of FIG. 5, with a plurality of orthogonal fasteners being shown further coupling together the second mass timber member and the second connector member.

Within the step of coupling the first connector member to attachment face 32 of first mass timber member 21, the method may thus include positioning the first connector member in place and/or in a desired position relative to the first mass timber member and thereafter initially coupling the first connector member to the first mass timber member via one or more positioning fasteners 106A and 106B seen in FIG. 4 to inhibit movement of the first connector member relative to the first mass timber member. Referring to FIG. 7 and within the step of coupling second connector member 38.1 to attachment face 34 of second mass timber member 22, the method may thus include positioning the second connector member in place and/or in a desired position relative to second mass timber member 22 and thereafter initially coupling the second connector member to the second mass timber member via one or more positioning fasteners 106A.1 and 106B.1 to inhibit movement of the second connector member relative to the second mass timber member.

The method may include further coupling the connector member to the structural member via additional fasteners 98 and 102 seen in FIGS. 3 and 4 extending through apertures 96 and 100. This may include shaping end portion 114 of drill jig 108 seen in FIG. 14 to snugly fit within respective ones of the counter-sunk apertures, drilling pilot holes into structural member or mass timber member 21 via the drill jig so inserted into respective ones of the countersunk apertures, and thereafter further coupling connector member 38 to the mass timber member via fasteners so guided by the pilot holes.

As seen in FIG. 4, the method may include coupling first connector member 38 to attachment face 32 of first mass timber member 21 via i) first plurality of fasteners 98 which are orthogonal to the attachment face of the first mass timber member and ii) second plurality of fasteners 102 seen in FIG. 3 which are angled relative to the attachment face of the first mass timber member. The method may include coupling second connector member 38.1 seen in FIG. 7 to attachment face 34 of second mass timber member 22 via i) a third plurality of fasteners 98.1 which are orthogonal to the attachment face of the second mass timber member and ii) a fourth set of fasteners 102.1 seen in FIG. 6 which are angled relative to the attachment face of the second mass timber member.

The method includes coupling together connector members 38 and 38.1 as seen in FIG. 1. Within the coupling step, the method may include positioning protrusion 56.1 of second connector member 38.1 within receptacle 57 of first connector member 38 and positioning protrusion 56 of the first connector member within receptacle 57.1 of the second connector member. Beam connector 36 with the connector member so coupled together, is substantially solid and forms a rectangular prism in shape which inhibits any space therebetween.

It will be appreciated that many variations are possible within the scope of the invention described herein. As seen in FIG. 4, apertures 96 or horizontal holes are shaped and can receive fasteners 98 in the form of bolts to connect the beam connector not only to timber beams but also steel columns or concrete assemblies accordingly, i.e. other structures materials.

Protrusions 56/56.1 and receptacles 57/57.1 as herein described may be referred to as male and female members or portions, respectively. In addition or alternatively: each protrusion with its second sub-portion 76B and first sub-portion 76A recessed in part relative thereof, may be referred to as a first pair of male and female members or portions, respectively; and each receptacle with its recessed portion 92 and flange 94, may be referred to as a second pair of male and female members or portions, respectively. In this case the first pair of male and female members or portions of first elongate member 38 may be shaped to couple with and/or mate with the second pair of male and female members or portions of second elongate member 38.1.

Figure 15:
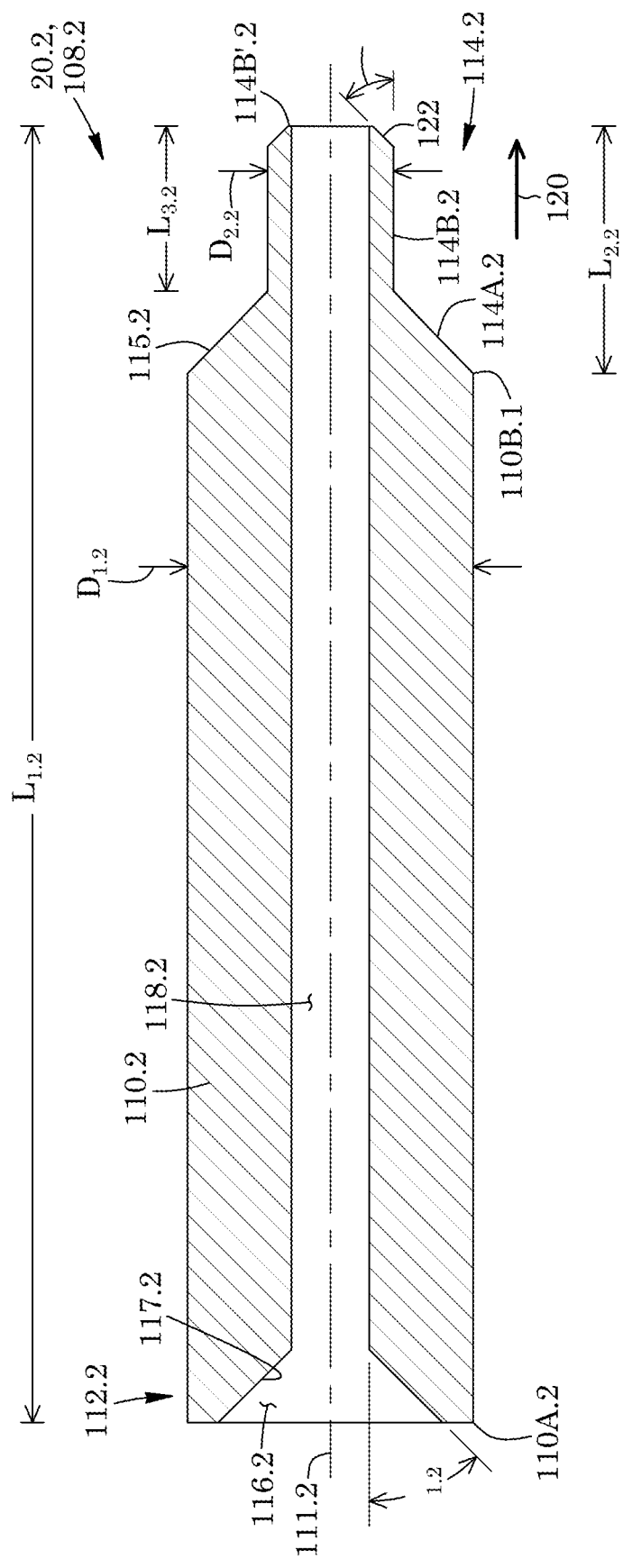
FIG. 15 is a longitudinal sectional view of a drill jig similar to FIG. 14 and according to another aspect.

FIG. 15 shows a drill jig 108.2 for a beam assembly, in this non-limiting embodiment a mass timber assembly 20.2, according to another aspect. Like parts have like numbers and functions as mass timber assembly 20 and drill jig 108 shown in FIGS. 1 to 14 with the addition of decimal extension "0.2". Mass timber assembly 20.2 and drill jig 108.2 thereof are substantially the same as mass timber assembly 20 and drill jig 108 thereof shown in FIGS. 1 to 14 with at least the following exceptions.

Figure 6:
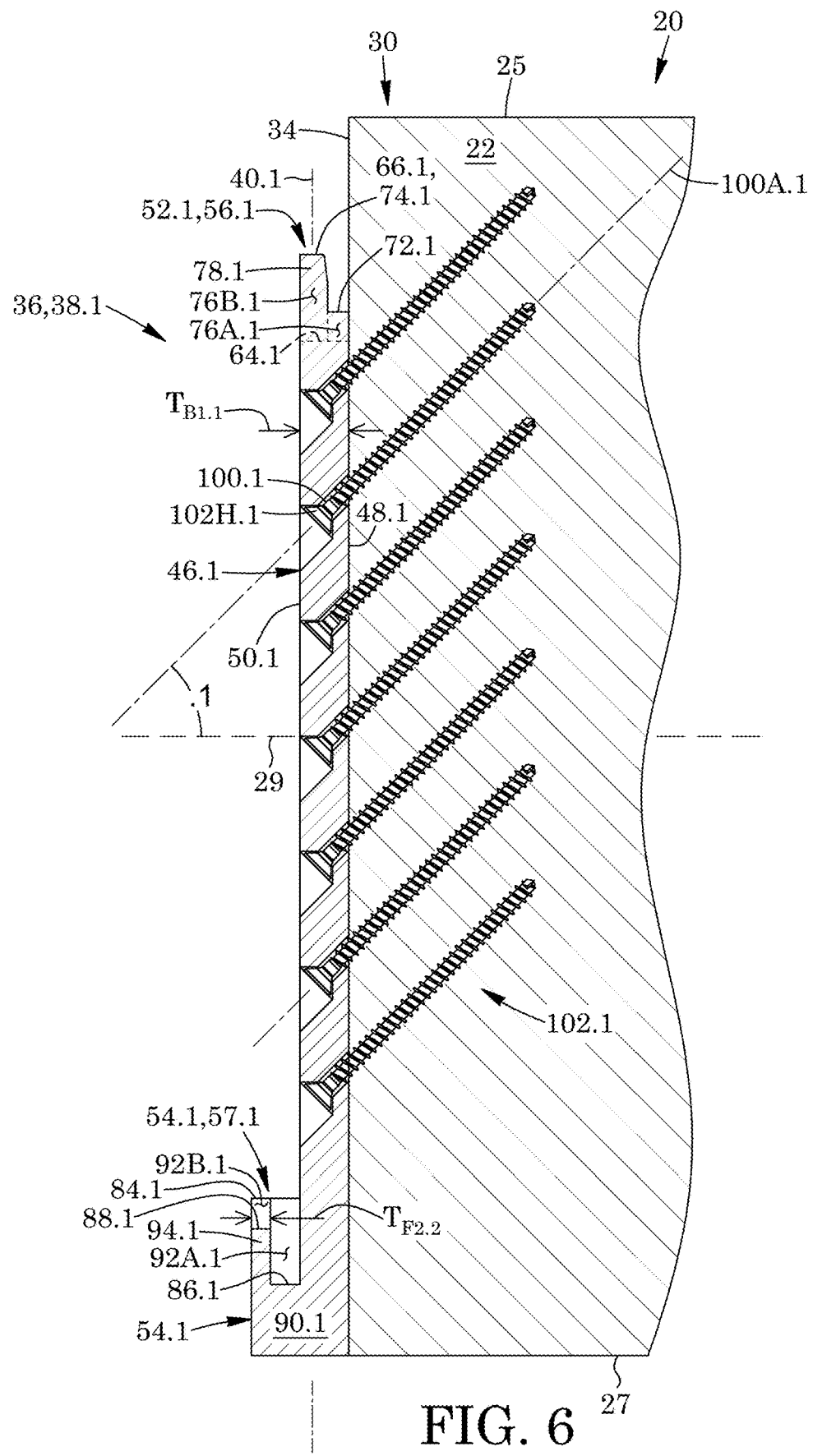
FIG. 6 is a sectional view taken along lines 6-6 of the second mass timber member and second connector member of FIG. 5, with a plurality of angled fasteners being shown coupling together the second mass timber member and the second connector member.

Distal sub-portion 114B.2 of end portion 114.2 of drill jig 108.2 is tapered in this embodiment. The end portion of the drill jig tapers radially inwardly in a direction 120 extending from proximal end 110A.2 of body 110.2 to distal end 114B'.2 of distal sub-portion 114B.2 thereof, at an acute angle $\Omega$ relative to longitudinal axis 111.2. End portion 114.2 includes an annular surface 122 in this non-limiting embodiment positioned adjacent distal end 114B'.2. The annular surface extends about bore 118.2 and is radially inwardly-sloped or angled in longitudinal section. In one non-limiting embodiment, end portion 114.2 of drill jig 108.2, upon extending within respective apertures 100.1 seen in FIG. 12, is configured such that surface 122 thereof aligns parallel and/or flush with attachment face 34 of corresponding mass timber member 22 seen in FIG. 12. However, this is not strictly required. In this example and referring back to FIG. 15, acute angle Ω or taper of the end portion of the drill jig of FIG. 15 is substantially equal to angle α. 1 at which the second plurality of apertures 100.1 extend along relative to axis 29 as seen in FIG. 6.

Referring back to FIG. 15, angle Ω is substantially equal to 45 degrees in one non-limiting example; however, this is not strictly required and other angles may be provided in other embodiments. The 45 degree cut at/adjacent the tip or distal end 114B'.2 of the nose or distal sub-portion 114B.2 of end portion 114 of drill jig 108.2 may function to accommodate deeper seating of the drill jig into the body of the connector member (such as body 46.1 of connector member 38.1 seen in FIG. 13). The drill jig (including end portion 114.2 thereof) so shaped, may thus promote a higher precision for drilling pilot holes and/or installing of connector members in a yet more optimized manner.

Where a component (e.g. an apparatus, assembly, member, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value ±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

Additional Description

Examples of beam connectors, connector members thereof, and beam assemblies comprising the same, have been described. The following clauses are offered as further description.

(1) A beam connector comprising: first and second connector members, each said connector member including a protrusion adjacent a first end portion thereof and which extends between a first side and a second side thereof and each said connector member including a receptacle adjacent a second end portion thereof, which extends from the first side to the second side thereof and which is arc-shaped laterally in a direction extending between the sides thereof and, wherein the receptacle of the first connector member is shaped to receive the protrusion of the second connector member and wherein the receptacle of the second connector member is shaped to receive the protrusion of the first connector member.

(2) A beam connector according to any clause herein, wherein each said receptacle has inner and outer curved surfaces which laterally are outwardly concave.

(3) A beam connector according to any clause herein, wherein the inner and outer curved surfaces of each said receptacle are continuous.

(4) A beam connector comprising: first and second connector members, each said connector member including a protrusion adjacent a first end portion thereof and which extends between a first side and a second side thereof and each said connector member including a receptacle adjacent a second end portion thereof and which has outwardly concave inner and outer curved surfaces which extend laterally from the first side to the second side thereof and, wherein the receptacle of the first connector member is shaped to receive the protrusion of the second connector member and wherein the receptacle of the second connector member is shaped to receive the protrusion of the first connector member.

(5) A beam connector according to any clause herein, wherein for each said receptacle the outer curved surface thereof has a radius of curvature which is greater than that of the inner curved surface thereof.

(6) A beam connector according to any clause herein, wherein for each said connector member the receptacle has sides which align with and/or are adjacent to the first side and the second side thereof.

(7) A beam connector according to any clause herein, wherein each said protrusion is arc-shaped laterally in a direction extending between the sides thereof.

(8) A beam connector comprising: first and second connector members, each said connector member including a protrusion adjacent a first end portion thereof, which extends between a first side and a second side thereof and which is arc-shaped laterally in a direction extending between the sides thereof, and each said connector member including a receptacle adjacent a second end portion thereof and which extends from a first side to a second side thereof and wherein the receptacle of the first connector member is shaped to receive the protrusion of the second connector member and wherein the receptacle of the second connector member is shaped to receive the protrusion of the first connector member.

(9) A beam connector according to any clause herein, wherein each said receptacle is arc-shaped laterally in a direction extending between the sides thereof.

(10) A beam connector according to any clause herein, wherein for each said connector member the protrusion thereof is axially outwardly-extending.

(11) A beam connector according to any clause herein, wherein for each said connector member the protrusion thereof has sides which align with and/or are adjacent to the first side and the second side thereof.

(12) A beam connector according to any clause herein, wherein for each said connector member the protrusion thereof has laterally-extending inner and outer curved surfaces.

(13) A beam connector according to any clause herein, wherein each said protrusion has laterally-extending inner and outer curved surfaces which are outwardly convex.

(14) A beam connector according to any clause herein, wherein for each said connector member the inner and outer curved surfaces of the protrusion thereof are continuous.

(15) A beam connector comprising: first and second connector members, each said connector member including a protrusion adjacent a first end portion thereof and which has outwardly convex inner and outer curved surfaces which extend laterally from a first side to a second side thereof and each said connector member including a receptacle adjacent a second end portion thereof and which extends from the first side to the second side thereof and wherein the receptacle of the first connector member is shaped to receive the protrusion of the second connector member and wherein the receptacle of the second connector member is shaped to receive the protrusion of the first connector member.

(16) A beam connector according to any clause herein, wherein for each said protrusion the inner curved surface thereof has a radius of curvature which is greater than that of the outer curved surface thereof.

(17) A beam connector according to any clause herein, wherein each said connector member is substantially the same in shape and/or function.

(18) A beam connector according to any clause herein, wherein the first connector member is configured to selectively couple to a first structural member and wherein the second connector member is configured to selectively couple to a second structural member.

(19) A beam connector according to any clause herein, wherein the connector members are configured to selectively couple together first and second structural members.

(20) A beam connector according to any clause herein, wherein the first connector member is shaped to couple with the second connector member.

(21) A beam connector according to any clause herein, wherein the first connector member is shaped to receive in part the second connector member and the second connector member is shaped to receive in part the first connector member.

(22) A beam connector according to any clause herein, wherein each said connector member has an outer support surface and wherein the support surfaces are of the connector members are shaped to extend flush and/or adjacent with each other when the connector members are coupled together.

(23) A beam connector comprising: first and second connector members, each said connector member including a protrusion which extends between a first side and a second side thereof and which is a first of outwardly convex and outwardly concave and each said connector member including a receptacle which extends between the first side and the second side thereof and which is a second of outwardly convex and outwardly concave, wherein the receptacle of the first connector member is shaped to receive the protrusion of the second connector member and wherein the receptacle of the second connector member is shaped to receive the protrusion of the first connector member.

(24) A beam connector comprising: first and second connector members, each said connector member including a first end portion which extends from a first side thereof to a second side thereof and which is outwardly curved laterally in a direction extending between the sides thereof, and each said connector member including a receptacle adjacent a second end portion thereof, wherein the receptacle of the first connector member is shaped to receive the first end portion of the second connector member and wherein the receptacle of the second connector member is shaped to receive the first end portion of the first connector member.

(25) A beam connector according to any clause herein, wherein each said connector member has one or more first fastener apertures which extend along or parallel to a first axis and wherein each said connector member has one or more second fastener apertures which extend along or parallel to a second axis which is angled relative to the first axis.

(26) A beam connector comprising: first and second connector members each including a protrusion and a receptacle, with the receptacle of the first connector member being shaped to receive the protrusion of the second connector member and with the receptacle of the second connector member being shaped to receive the protrusion of the first connector member, wherein each said connector member has a first plurality of apertures which extend parallel to a first axis and which are arranged to receive a first plurality of fasteners, wherein each said connector member has a second plurality of apertures which extend parallel to a second axis which is angled relative to the first axis and which are arranged to receive a second plurality of fasteners, and wherein for each said connector member the first plurality of fasteners thereof are orthogonal thereto and the second plurality of fasteners are angled relative thereto.

(27) A beam connector according to any clause herein, wherein each said connector member has a first plurality of apertures which extend parallel to a first axis and which are arranged to receive a first plurality of fasteners, wherein each said connector member has a second plurality of apertures which extend parallel to a second axis which is angled relative to the first axis and which are arranged to receive a second plurality of fasteners, and wherein for each said connector member the first plurality of fasteners thereof are orthogonal thereto and the second plurality of fasteners are angled relative thereto.

(28) A beam connector according to any clause herein, wherein each of the first plurality of apertures is interposed between respective ones of the second plurality of apertures.

(29) A beam connector according to any clause herein, wherein each of the first plurality of apertures is interposed laterally and longitudinally between respective ones of the second plurality of apertures.

(30) A beam connector according to any clause herein, wherein each of the first plurality of apertures is enclosed or surrounded by a respective subgroup of the second plurality of apertures.

(31) A beam connector according to any clause herein, wherein the first plurality of apertures align in rows and columns and/or wherein the second plurality of apertures align in rows and columns.

(32) A beam connector according to any clause herein, wherein the first plurality of apertures align in X number of rows and Y number of columns and/or wherein the second plurality of apertures align in X+1 number of rows and Y+1 number of columns.

(33) A beam connector according to any clause herein, wherein the first plurality of apertures are evenly spaced-apart relative to each other and/or wherein the second plurality of apertures are evenly spaced-apart relative to each other and/or relative to the first plurality of apertures.

(34) A beam connector according to any clause herein, wherein for each said connector member the first plurality of apertures thereof extend along and/or adjacent the sides thereof and/or the second plurality of apertures thereof inwardly positioned from the sides thereof.

(35) A beam connector according to any clause herein, wherein for each said connector member, the first plurality of apertures thereof extend adjacent the receptacle and the protrusion thereof and/or the second plurality of apertures thereof are inwardly positioned from the receptacle and the protrusion thereof.

(36) A beam connector according to any clause herein, wherein for each said connector member, the first plurality of apertures are positioned a first rectangular arrangement and/or the second plurality of apertures are positioned in a second rectangular arrangement.

(37) A beam connector according to any clause herein, wherein each said connector member is shaped to receive one or more positioning fasteners.

(38) A beam connector according to any clause herein, wherein each said connector member has one or more positioning apertures arranged to receive respective one or more positioning fasteners.

(39) A beam connector according to any clause herein, wherein for each said connector member a first said positioning aperture thereof is near or adjacent the protrusion thereof and a second said positioning aperture thereof is near or adjacent the receptacle thereof.

(40) A beam connector according to any clause herein, wherein for each said connector member the first and second positioning apertures thereof align longitudinally.

(41) A beam connector according to any clause herein, wherein for each said connector member the first positioning aperture thereof is near or adjacent a first side thereof and the second positioning aperture thereof is near or adjacent a second side thereof.

(42) A beam connector according to any clause herein, wherein for each said connector member the positioning apertures thereof are countersunk.

(43) A beam connector comprising: first and second connector members, each said connector member including a protrusion adjacent a first end portion thereof and a receptacle adjacent a second end portion there-of, wherein the receptacle of the first connector member is shaped to receive the protrusion of the second connector member and wherein the receptacle of the second connector member is shaped to receive the protrusion of the first connector member, and wherein each said connector member has a pair of positioning apertures near or adjacent the protrusion and the receptacle thereof, respectively, the positioning apertures being shaped to receive positioning fasteners therethrough to promote precise positioning of the connector members relative to beams prior to fully fastening the connector members thereto.

(44) A beam connector according to any clause herein, wherein each said connector member has a plurality of apertures extending therethrough shaped to receive fasteners therethrough for fully coupling to a respective beam.

(45) A beam connector according to any clause herein, wherein for each said connector member the first and second positioning apertures thereof are inwardly positioned from the sides thereof.

(46) A beam connector according to any clause herein, wherein each said connector member includes a body coupling the protrusion and the receptacle thereof together and a base portion adjacent the receptacle, with the base portion having a thickness greater than that of the body.

(47) A beam connector according to any clause herein, wherein each said protrusion is L-shaped in side or lateral profile.

(48) A beam connector according to any clause herein, wherein each said protrusion is lens-shaped.

(49) A beam connector according to any clause herein, wherein each said protrusion has a converging meniscus lens type shape.

(50) A beam connector according to any clause herein, wherein each said receptacle is C-shaped in lateral section.

(51) A beam connector according to any clause herein, wherein each said receptacle has a recessed portion that is curved at least in part.

(52) A beam connector according to any clause herein, wherein each said receptacle has a recessed portion that is lens-shaped.

(53) A beam connector according to any clause herein, wherein each said receptacle has a recessed portion that has a converging meniscus lens type shape.

(54) A beam connector according to any clause herein, wherein for each said connector member the protrusion thereof has a first sub-portion which is arc-shaped and/or a circular segment in front profile and/or a second sub-portion which is arc-shaped and/or a circular segment in front profile.

(55) A beam connector according to any clause herein, wherein for each said connector member the first sub-portion of the protrusion thereof extends from an inner face towards an outer face thereof.

(56) A beam connector according to any clause herein, wherein for each said connector member the second sub-portion of the protrusion thereof extends from the outer face towards the inner face thereof.

(57) A beam connector according to any clause herein, wherein for each said connector member the first sub-portion of the protrusion thereof is generally rectangular in side or lateral profile.

(58) A beam connector according to any clause herein, wherein for each said connector member the second sub-portion of the protrusion thereof is generally rectangular in side or lateral profile.

(59) A beam connector according to any clause herein, wherein for each said protrusion the second sub-portion thereof couples to and extends laterally and axially outwards from the first sub-portion thereof.

(60) A beam connector according to any clause herein, wherein for each said protrusion the second sub-portion thereof is larger in extent/span compared to first sub-portion thereof.

(61) A beam connector according to any clause herein, wherein for each said connector member the protrusion thereof, and/or the second sub-portion of the protrusion thereof, tapers outwards at least in part and relative to the longitudinal axis thereof.

(62) A beam connector according to any clause herein, wherein for each said connector member the receptacle thereof has an inner curved surface and the protrusion thereof has an outer curved surface, with the inner curved surface of the receptacle having a radius of curvature substantially equal to that of the outer curved surface of the protrusion.

(63) A beam connector according to any clause herein, wherein for each said connector member the receptacle thereof has an outer curved surface and the protrusion thereof has an inner curved surface, with the outer curved surface of the receptacle having a radius of curvature substantially equal to that of the inner curved surface of the protrusion.

(64) A beam connector comprising: first and second connector members, each said connector member including a pair of male members which extend between a first side and a second side thereof and which are outwardly convex and each said connector member including a pair of female members which extend between the first side and the second side thereof and which are outwardly concave, wherein the pair of male members of the first connector member are shaped to receive the pair of female members of the second connector member and wherein the pair of male members of the second connector member are shaped to receive the pair of female members of the first connector member.

(65) A beam connector comprising: first and second connector members, each said connector member including a pair of male members having first and second radii of curvatures, respectively, and each said connector member including a pair of female members having said first and second radii of curvatures, respectively, wherein the pair of male members of the first connector member are shaped to receive the pair of female members of the second connector member and wherein the pair of male members of the second connector member are shaped to receive the pair of female members of the first connector member.

(66) A beam connector according to any clause herein, wherein for each connector member the pair of male members thereof extend from the first side to the second side thereof.

(67) A beam connector according to any clause herein, wherein each said male member is arc-shaped.

(68) A beam connector according to any clause herein, wherein each said male member is outwardly convex.

(69) A beam connector according to any clause herein, wherein a first of the male members has an outer curved surface with a first radius of curvature and wherein a second of the male members has an outer curved surface with a second radius of curvature which is different from the first radius of curvature of the first of the male members.

(70) A beam connector according to any clause herein, wherein a first of the female members has an outer curved surface with a first radius of curvature and wherein a second of the female members has an outer curved surface with a second radius of curvature which is different from the first radius of curvature of the first of the female members.

(71) A beam connector according to any clause herein, wherein the first radius of curvature of the male members is substantially equal to the first radius of curvature of the female members.

(72) A beam connector according to any clause herein, wherein the second radius of curvature of the male members is substantially equal to the second radius of curvature of the female members.

(73) A beam connector according to any clause herein, wherein the pair of male members and the pair of female members extend between respective first and second pairs of shoulders.

(74) A beam connector according to any clause herein, wherein the first pair of shoulders of the first connector member are shaped to abut with the second pair of shoulders of the second connector member.

(75) A beam connector comprising: first and second longitudinally-extending connector members, each said connector member including a protrusion adjacent a first end portion thereof and which extends between a first side and a second side thereof and each said connector member including a receptacle adjacent a second end portion thereof and which extends in an arc-shape laterally from the first side to the second side thereof, wherein the receptacle of the first connector member is shaped to receive the protrusion of the second connector member and wherein the receptacle of the second connector member is shaped to receive the protrusion of the first connector member.

(76) In combination, a beam connector according to any clause herein, together with a drill jig therefor, the drill jig having a bore extending therethrough and including an end portion shaped to be received within respective countersunk said apertures of the connector members.

(77) A beam assembly according to any clause herein, including a drill jig, the drill jig having a bore extending therethrough and including an end portion shaped to be received within respective countersunk said apertures of the connector members.

(78) A drill jig for a beam connector (and/or accordingly to any clause herein), the drill jig comprising: an elongate body having a bore extending between proximal and distal ends thereof, the bore being shaped to snugly receive a drill bit therethrough; an end portion shaped to fit within and/or mate with at least one countersunk aperture of the beam connector.

(79) A drill jig according to any clause herein, wherein the end portion of the drill jig is frustoconical at least in part.

(80) A drill jig according to any clause herein, wherein the end portion of the drill jig includes a distal sub-portion shaped to fit within an inner bore of the at least one countersunk aperture and includes a proximal sub-portion shaped to fit within and abut a flared/tapered bore of the at least one countersunk aperture.

(81) A drill jig according to any clause herein, wherein the end portion of the drill jig includes a distal sub-portion that is sleeve shaped and a proximal sub-portion which extends between the distal sub-portion and the body thereof, the proximal sub-portion of the drill jig being frustoconical in shape.

(82) A drill jig according to any clause herein, wherein the end portion of the drill jig includes a distal sub-portion that is sleeve shaped and a proximal sub-portion which extends between the distal sub-portion and the body thereof, the proximal sub-portion of the drill jig being frustoconical in shape.

(83) A drill jig according to any clause herein, wherein the end portion of the drill jig is shaped to be a function of the thickness of the connector member.

(84) A drill jig according to any clause herein, wherein the distal sub-portion of the end portion of the drill jig has a length proportionate to and/or which is a function of the thickness of the connector member.

(85) A drill jig according to any clause herein, wherein the distal sub-portion of the end portion of the drill jig has a length which is variable so to accommodate connector members of different thicknesses.

(86) A drill jig according to any clause herein, wherein the end portion of the drill jig is tapered.

(87) A drill jig according to any clause herein, wherein the distal sub-portion of the end portion of the drill jig is tapered.

(88) A drill jig according to any clause herein, wherein the end portion of the drill jig extends longitudinally outwards and tapers radially inwardly at an acute angle relative to the longitudinal axis thereof.

(89) A drill jig according to any clause herein, wherein the end portion of the drill jig extends longitudinally outwards and tapers radially inwardly at a substantially 45 degree angle relative to the longitudinal axis thereof.

(90) A drill jig according to any clause herein, wherein the end portion of the drill jig, upon extending within respective ones of the second and/or angled plurality of apertures, is configured to align flush with the attachment face of corresponding structural member

(91) A drill jig according to any clause herein, wherein the angle at which the end portion of the drill jig tapers is substantially equal to the angle at which the second plurality of apertures of the connector member extend relative to its corresponding structural member and/or relative to the lateral axis of its corresponding connector member.

(92) A drill jig according to any clause herein, wherein the drill jig is shaped to promoting gripping thereof by a gloved hand.

(93) A drill jig according to any clause herein, wherein the drill jig is tubular in outer shape.

(94) A drill jig according to any clause herein, wherein the end portion is adjacent the distal end of the body and wherein the bore of the drill jig is outwardly enlarged or flared adjacent the proximal end of the body.

(95) A drill jig according to any clause herein, wherein the end portion is shaped to snugly fit within the at least one countersunk aperture of the beam connector.

(96) A drill jig according to any clause herein, wherein the drill jig is shaped to promote angularly positioning of a pilot hole along which a fastener subsequently extends for coupling the beam connector to a beam.

(97) A drill jig according to any clause herein, wherein the end portion of the drill jig is configured to selectively mate with the at least one countersunk aperture so as to inhibit movement of the drill jig relative to the beam connector.

(98) A beam assembly according to any clause herein, including a drill jig according to any clause herein.

(99) In combination, a beam assembly to any clause herein and a drill jig according to any clause herein.

(100) A kit comprising one or more beam assemblies accordingly to any clause herein and one or more drill jigs according to any clause herein.

(101) A connector member according to any clause herein.

(102) A beam assembly according to any clause herein, including a plurality of fasteners therefor.

(103) A beam assembly according to any clause herein, including a plurality of fasteners via which the connector members selectively couple to respective structural members.

(104) A beam assembly comprising first and second structural members and the beam connector according to any clause herein, wherein the first connector member couples to the first structural member, wherein the second connector member couples to the second structural member and wherein the first and second structural members couple together via the connector members.

(105) A beam assembly comprising: first and second structural members; and first and second connector members which couple to the first and second structural members, respectively, each said connector member including a protrusion adjacent a first end portion thereof and a receptacle adjacent a second end portion thereof, for each said connector member the receptacle and protrusion thereof extend from first to second sides thereof, for each said connector member at least one of the receptacle and protrusion thereof is arc-shaped laterally in a direction extending between the sides thereof, wherein the receptacle of the first connector member is shaped to receive the protrusion of the second connector member, wherein the receptacle of the second connector member is shaped to receive the protrusion of the first connector member and wherein the first and second structural members couple together via the first and second connector members thereby.

(106) A beam assembly according to any clause herein, wherein the beam assembly comprises mass timber and/or a mass timber assembly.

(107) A method of coupling together structural members, the method comprising: forming a pair of connector members each being substantially the same in shape; coupling a first said connector member to an attachment face of a first said structural member via a first set of fasteners which are orthogonal to the attachment face of the first said structural member and via a second set of fasteners which are angled relative to the attachment face of the first said structural member; coupling a second said connector member to an attachment face of a second said structural member via a third set of fasteners which are orthogonal to the attachment face of the second said structural member and via a fourth set of fasteners which are angled relative to the attachment face of the second said structural member; and coupling together the connector members.

(108) A method according to any clause herein, including with the forming step, providing each said connector member with a receptacle and a protrusion spaced-apart from the receptacle and within the coupling step, positioning the protrusion of the second said connector member within the receptacle of the first said connector member and positioning the protrusion of the first said connector member within the receptacle of the second said connector member.

(109) A method according to any clause herein, including within the forming step, providing each said connector member with a plurality of apertures to receive respective fasteners therethrough, including a first plurality of apertures which extend parallel to a first axis and a second plurality of apertures which extend parallel to a second axis which is angled relative to the first axis.

(110) A method according to any clause herein, including within the forming step for each said connector member, interposing each of the first plurality of apertures between respective ones of the second plurality of apertures.
(111) A method according to any clause herein, including within the forming step for each said connector member, interposing each of the first plurality of apertures laterally and longitudinally between respective ones of the second plurality of apertures.
(112) A method according to any clause herein, including within the forming step for each said connector member, enclosing or surrounding each of the first plurality of apertures by a respective subgroup of the second plurality of apertures.
(113) A method according to any clause herein, including within the forming step for each said connector member, aligning the first plurality of apertures align in rows and columns and/or aligning the second plurality of apertures align in rows and columns.
(114) A method according to any clause herein, including within the forming step for each said connector member, aligning the first plurality of apertures align in X number of rows and Y number of columns and/or aligning the second plurality of apertures align in X+1 number of rows and Y+1 number of columns.
(115) A method according to any clause herein, including within the forming step for each said connector member, spacing the first plurality of apertures evenly relative to each other and/or spacing the second plurality of apertures evenly relative to each other and/or relative to the first plurality of apertures.
(116) A method according to any clause herein, including within the forming step for each said connector member, positioning the first plurality of apertures to extend along and/or adjacent sides thereof and/or positioning the second plurality of apertures inwardly from the sides thereof.
(117) A method according to any clause herein, including within the forming step for each said connector member, positioning the first plurality of apertures to extend adjacent the receptacle and the protrusion thereof and/or positioning the second plurality of apertures inwardly from the receptacle and the protrusion thereof.
(118) A method according to any clause herein, including within the forming step for each said connector member, positioning the first plurality of apertures in a first rectangular arrangement and/or positioning the second plurality of apertures in a second rectangular arrangement.
(119) A method according to any clause herein, including within coupling the first said connector member to the attachment face of the first said structural member step, positioning the first said connector member in place and/or in a desired position relative to the first said structural member and thereafter initially coupling the first said connector member to the first said structural member via one or more positioning fasteners to inhibit movement of the first said connector member relative to the first said structural member.
(120) A method according to any clause herein, including within coupling the second said connector member to the attachment face of the second said structural member step, positioning the second said connector member in place and/or in a desired position relative to the second said structural member and thereafter initially coupling the second said connector member to the second said structural member via one or more positioning fasteners to inhibit movement of the second said connector member relative to the second said structural member.
(121) A method according to any clause herein, including within the forming step for each said connector member, providing each said connector member with at least two spaced-apart positioning apertures arranged to receive respective one or more positioning fasteners and inhibit movement thereof relative to a respective said structural member.
(122) A method according to any clause herein, including within the forming step for each said connector member, forming a first said positioning aperture thereof near or adjacent the protrusion thereof and a second said positioning aperture thereof near or adjacent the receptacle thereof.
(123) A method according to any clause herein, including within the forming step for each said connector member, positioning the first and second positioning apertures thereof to align longitudinally.
(124) A method of installing a beam connector, the beam connector including a connector member having a plurality of apertures extending therethrough, the method comprising: providing the connector member with a pair of positioning apertures extending therethrough and between which are positioned the plurality of apertures; coupling the connector member to the structural member via fasteners extending through the positioning apertures so as to promote positioning of the connector member relative to the structural member; and further coupling the connector member to the structural member via additional fasteners extending through the plurality of apertures.
(125) A method according to any clause herein, including prior to the coupling step, drilling pilot holes into the structural member via a drill jig so inserted into respective ones of the positioning apertures;
(126) A method according to any clause herein, wherein the positioning apertures are countersunk and wherein the drill jig includes an end portion shaped to mate and/or snugly fit within respective ones of the positioning apertures so shaped.
(127) A method according to any clause herein, including within the providing step, arranging the positioning apertures to be axially offset and/or near respective sides of the connector member.
(128) A method of installing a beam connector, the method comprising: coupling a connector member to an attachment face of a structural member via a pair of positioning fasteners, the connector member including a plurality of countersunk apertures; shaping an end portion of a drill jig to snugly fit within respective ones of the countersunk apertures; drilling pilot holes into the structural member via the drill jig so inserted into respective ones of the countersunk apertures; and further coupling the connector member to the structural member via fasteners so guided by the pilot holes.
(129) A method according to any clause herein, including providing the drill jig with a bore extending therethrough and which is shaped to promote use a drill equal to or less than a predetermined threshold.
(130) A method according to any clause herein, wherein the drill jig is configured to inhibit use a drill bit which exceeds a predetermined threshold.

(131) A method according to any clause herein, including shaping the drill jig to facilitate receipt of a drill bit therein and therethrough.

(132) A method according to any clause herein, including shaping the drill jig with a drill bit bore having an outwardly flared opening shaped to promote receiving the drill bit therethrough.

(133) A method according to any clause herein, including shaping the end portion of the drill jig to be frusto-conical at least in part and/or sleeve shaped at least in part.

(134) A method of installing a beam connector, the beam connector including a pair of connector members each having a plurality of apertures extending therethrough and via which a pair of structural members are coupled together, the method comprising: providing each said connector member with a pair of positioning apertures extending therethrough and between which are positioned the plurality of apertures thereof, including arranging the positioning apertures to be axially offset and/or near respective sides of the respective said connector member; drilling pilot holes into respective said structural members via a drill jig so inserted into respective ones of the positioning apertures; coupling respective said connector members to respective said the structural members via fasteners extending through the positioning apertures so as to promote positioning of the connector members relative to the structural members; and further coupling the connector members to the structural members via additional fasteners extending through the plurality of apertures.

(135) A method according to any clause herein, including within the forming step for each said connector member, positioning the first and second positioning apertures thereof inwardly from sides thereof.

(136) A beam assembly or method according to any clause herein, wherein each said structural member comprises a mass timber product.

(137) Apparatus including any new and inventive feature, combination of features, or sub-combination of features as described herein.

(138) Methods including any new and inventive steps, acts, combination of steps and/or acts or sub-combination of steps and/or acts as described herein.

---

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A beam connector comprising:
   first and second longitudinally-extending connector members, each said connector member including a body having a thickness, each said connector member including a protrusion adjacent a first end portion thereof and which extends from adjacent a first side thereof to adjacent a second side thereof, wherein for each said connector member the protrusion thereof has inner and outer curved surfaces and is formed of generally arc-shaped first and second sub-portions each having a thickness less than that of the body thereof, each said connector member including a receptacle adjacent a second end portion thereof and which extends in an arc-shape laterally from adjacent the first side to adjacent the second side thereof, wherein for each said connector member the receptacle thereof has inner and outer curved surfaces and is formed of a base portion with a thickness that is greater than that of the body thereof, wherein for each said connector member the receptacle defines a lip and a recessed portion defined between an outer support surface of the connector member and said lip,
   wherein the receptacle of the first connector member is shaped to receive the protrusion of the second connector member and wherein the receptacle of the second connector member is shaped to receive the protrusion of the first connector member such that the outer curved surface of the protrusion of the second connector member mates with the inner curved surface of the receptacle of the first connector member, the inner curved surface of the protrusion of the second connector member mates with the outer curved surface of the receptacle of the first connector member, the outer curved surface of the protrusion of the first connector member mates with the inner curved surface of the receptacle of the second connector member, and the inner curved surface of the protrusion of the first connector member mates with the outer curved surface of the receptacle of the second connector member.

2. The beam connector according to claim 1, wherein each said connector member has a first plurality of apertures which extend parallel to a first axis and which are arranged to receive a first plurality of fasteners, wherein each said connector member has a second plurality of apertures which extend parallel to a second axis which is angled relative to the first axis, the second plurality of apertures being arranged to receive a second plurality of fasteners, wherein for each said connector member the first plurality of fasteners thereof are orthogonal to a longitudinal axis of each said connector member and the second plurality of fasteners are angled relative to the longitudinal axes of each said connector member, and wherein each of the first plurality of apertures is interposed laterally and longitudinally between respective ones of the second plurality of apertures.

3. The beam connector according to claim 1, wherein each said connector member has a first plurality of apertures which extend parallel to a first axis and which are arranged to receive a first plurality of fasteners, wherein each said connector member has a second plurality of apertures which extend parallel to a second axis which is angled relative to the first axis, the second plurality of apertures being arranged to receive a second plurality of fasteners, wherein for each said connector member the first plurality of fasteners thereof are orthogonal to a longitudinal axis of each said connector member and the second plurality of fasteners are angled relative to the longitudinal axes of each said connector member, and wherein each of the first plurality of apertures is enclosed or surrounded by a respective subgroup of the second plurality of apertures.

4. The beam connector according to claim 1, wherein each said connector member has a first plurality of apertures which extend parallel to a first axis and which are arranged to receive a first plurality of fasteners, wherein each said connector member has a second plurality of apertures which extend parallel to a second axis which is angled relative to the first axis, the second plurality of apertures being arranged to receive a second plurality of fasteners, wherein for each said connector member the first plurality of fasteners thereof are orthogonal to a longitudinal axis of each said connector member and the second plurality of fasteners are angled relative to the longitudinal axes of each said connector member, and wherein the first plurality of apertures align in X number of rows and Y number of columns and wherein the second plurality of apertures align in X+1 number of rows and Y+1 number of columns.

5. A beam assembly comprising first and second structural members and the beam connector according to claim 1, wherein the first connector member couples to the first structural member, wherein the second connector member couples to the second structural member and wherein the first and second structural members couple together via the connector members.

6. The beam connector according to claim 1, wherein each said connector member has a plurality of apertures extending therethrough shaped to receive fasteners therethrough for coupling to a respective beams and wherein each said connector member has a pair of positioning apertures near or adjacent the protrusion and the receptacle thereof, respectively, the positioning apertures being shaped to receive positioning fasteners therethrough to promote precise positioning of the connector members relative to the respective beams prior to fully fastening the connector members to the respective beams.

7. A drill jig for the beam connector according to claim 1, the drill jig comprising:
an elongate body having a bore extending between proximal and distal ends thereof, the bore being shaped to snugly receive a drill bit therethrough; and
an end portion shaped to fit within and/or mate with at least one countersunk aperture of the beam connector, the end portion including a distal sub-portion shaped to fit within an inner bore of the at least one countersunk aperture, and the end portion including a proximal sub-portion shaped to fit within and abut a flared and/or tapered bore of the at least one countersunk aperture.

8. The beam connector according to claim 1, wherein each said connector member has a plurality of apertures extending therethrough shaped to receive fasteners therethrough for coupling to a respective beams, wherein each said connector member has a pair of spaced-apart positioning apertures, the positioning apertures being shaped to receive positioning fasteners therethrough to promote precise positioning of the connector members relative to the respective beams prior to fully fastening the connector members to the respective beams, wherein for each said connector member the pair of positioning apertures thereof are aligned longitudinally.

9. The beam connector according to claim 1, wherein for each said connector member the protrusion thereof is at least in part an isosceles trapezoid in a cross-sectional view.

10. The beam connector according to claim 1, wherein for each said connector member the protrusion thereof is L-shaped in side or lateral profile and the receptacle thereof is C-shaped in side profile and front profile.

11. The beam connector according to claim 1, wherein each said connector member has a longitudinal axis extending between the first and second end portions thereof, wherein each said connector member has a lateral axis perpendicular to the longitudinal axis thereof and extending between the first and second sides thereof, and wherein each said protrusion is larger in lateral extent than longitudinal extent and/or wherein for each said connector member, the protrusion thereof has a length extending from the first end portion towards the second end portion thereof and the protrusion thereof has a width extending from adjacent the first side to adjacent the second side thereof, with the width being more elongate than said length.

12. The beam connector according to claim 1, wherein each said connector member has a plurality of fastener apertures extending therethrough from an inner support surface to the outer support surface thereof, and wherein for each said connector member the protrusion and the receptacle thereof are free of and spaced from said plurality of fastener apertures.

13. The beam connector according to claim 1, wherein the outer support surfaces of the connector members are shaped to extend flush and/or adjacent with each other when the connector members are coupled together, wherein for each said connector member the inner and outer curved surfaces of the protrusion thereof are substantially perpendicular to the outer support surface thereof, and wherein for each said connector member the inner and outer curved surfaces of the receptacle thereof are substantially perpendicular to the outer support surface thereof.

14. The beam connector according to claim 1, wherein for each said receptacle the outer curved surface thereof has a radius of curvature which is greater than that of the inner curved surface thereof and wherein for each said protrusion the inner curved surface thereof has a radius of curvature which is greater than that of the outer curved surface thereof.

15. The beam connector according to claim 1, wherein for each said connector member the inner curved surface of the receptacle thereof has a radius of curvature substantially equal to that of the outer curved surface of the protrusion thereof, and wherein for each said connector member the outer curved surface of the receptacle thereof has a radius of curvature substantially equal to that of the inner curved surface of the protrusion thereof.

16. The beam connector according to claim 1, wherein each said connector member has a plurality of fastener apertures extending therethrough from an inner support surface to the outer support surface thereof, wherein for each said connector member the plurality of fastener apertures thereof are arranged in a plurality of longitudinally-extending columns spaced laterally inwards from the protrusion and receptacle thereof, and wherein for each said connector member the plurality of fastener apertures thereof are arranged in a plurality of laterally-extending rows spaced longitudinally inwards from the protrusion and receptacle thereof, with no said fastener apertures laterally aligning with said protrusions and said receptacles.

17. The beam connector according to claim 1, wherein for each said connector member the protrusion thereof is outwardly convex in a direction facing the first end portion thereof, and wherein for each said connector member the receptacle thereof is outwardly concave in a direction facing the protrusion thereof.

18. The beam connector according to claim 1, wherein for each said connector member the first sub-portion of the protrusion thereof extends from an inner support surface towards the outer support surface thereof, and wherein for each said connector member the second sub-portion of the protrusion thereof extends from the outer support surface towards the inner support surface thereof.

19. The beam connector according to claim 1, wherein for each said connector member the inner and outer curved surfaces of the receptacle thereof are outwardly concave and extend laterally from adjacent the first side to adjacent the second side thereof, and/or wherein for each said connector member the inner and outer curved surfaces of the protrusion thereof are outwardly convex and extend laterally from adjacent the first side to adjacent the second side thereof.

20. A beam connector comprising:

first and second longitudinally-extending connector members each including a body having a thickness, wherein each said connector member includes a laterally-extending protrusion adjacent a first end portion of the body thereof, wherein for each said connector member the protrusion thereof is formed of first and second sub-portions having differing thicknesses, wherein for each said connector member the first and second sub-portions of the protrusion thereof have outwardly convex inner and outer curved surfaces, respectively, wherein for each said connector member the second sub-portion of the protrusion thereof extends beyond the first sub-portion of the protrusion thereof, wherein each said connector member includes a laterally-extending receptacle adjacent a second end portion of the body thereof, wherein for each said connector member the receptacle thereof includes a base portion with a thickness that is greater than the thickness of the body thereof, wherein for each said connector member the receptacle thereof defines a recessed portion between the body thereof and a lip thereof, wherein for each said connector member the recessed portion and the lip thereof have outwardly concave inner and outer curved surfaces, respectively, wherein the recessed portion of the first connector member is shaped to receive the second sub-portion of the protrusion of the second connector member and wherein the recessed portion of the second connector member is shaped to receive the second sub-portion of the protrusion of the first connector member such that the outer curved surface of the second sub-portion of the protrusion of the second connector member mates with the inner curved surface of the recessed portion of the first connector member, the inner curved surface of the first sub-portion of the protrusion of the second connector member mates with the outer curved surface of the lip of the first connector member, the outer curved surface of the second sub-portion of the protrusion of the first connector member mates with the inner curved surface of the recessed portion of the second connector member, and the inner curved surface of the first sub-portion of the protrusion of the first connector member mates with the outer curved surface of the lip of the second connector member.

* * * * *